United States Patent
Cho et al.

(10) Patent No.: US 10,133,298 B2
(45) Date of Patent: Nov. 20, 2018

(54) MEMORY SYSTEM WITH MULTIPLE CHANNEL INTERFACES AND METHOD OF OPERATING SAME

(71) Applicants: Young-Jin Cho, Seoul (KR); Jae-Geun Park, Suwon-si (KR); Young-Kwang Yoo, Yongin-si (KR); Soon-Suk Hwang, Ansan-si (KR)

(72) Inventors: Young-Jin Cho, Seoul (KR); Jae-Geun Park, Suwon-si (KR); Young-Kwang Yoo, Yongin-si (KR); Soon-Suk Hwang, Ansan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 80 days.

(21) Appl. No.: 14/995,834

(22) Filed: Jan. 14, 2016

(65) Prior Publication Data
US 2016/0299525 A1   Oct. 13, 2016

(30) Foreign Application Priority Data
Apr. 7, 2015   (KR) .................. 10-2015-0049074

(51) Int. Cl.
G06F 1/10 (2006.01)
G06F 1/04 (2006.01)
G06F 5/06 (2006.01)

(52) U.S. Cl.
CPC ................ G06F 1/10 (2013.01); G06F 1/04 (2013.01); G06F 5/06 (2013.01)

(58) Field of Classification Search
CPC .................................. G06F 1/04; G06F 5/06
See application file for complete search history.

(56) References Cited

U.S. PATENT DOCUMENTS

| | | | | |
|---|---|---|---|---|
| 6,333,893 | B1* | 12/2001 | Keeth | G11C 7/1072 365/194 |
| 6,636,955 | B1* | 10/2003 | Kessler | G06F 13/1689 711/166 |
| 6,836,852 | B2 | 12/2004 | Wang et al. | |
| 7,706,996 | B2 | 4/2010 | Chong et al. | |
| 7,863,960 | B2 | 1/2011 | Wang et al. | |
| 8,122,395 | B2 | 2/2012 | Feng | |
| 8,190,944 | B2 | 5/2012 | Senohrabek et al. | |
| 8,232,953 | B2 | 7/2012 | Tsukio | |
| 8,750,055 | B2 | 6/2014 | Kim et al. | |
| 8,786,337 | B2 | 7/2014 | Mohajeri et al. | |
| 2004/0236894 | A1* | 11/2004 | Grundy | G06F 13/4022 711/1 |
| 2007/0283077 | A1* | 12/2007 | Klein | G11C 7/1045 711/100 |

(Continued)

*Primary Examiner* — Charles Rones
*Assistant Examiner* — Tian-Pong Chang
(74) *Attorney, Agent, or Firm* — Volentine, Whitt & Francos, PLLC

(57) ABSTRACT

A memory system including a memory controller with channel interfaces connecting memory groups via channels. Each channel interface communicates control, address and/or data (CAD) signals to a channel-connected memory group synchronously with a slave clock derived from an input clock. The various slave clocks being uniquely generated by application of channel interface specific phase/frequency modulation or temporal delay, such that the respective CAD signals are characterized by skewed transition timing.

6 Claims, 26 Drawing Sheets

(56) References Cited

U.S. PATENT DOCUMENTS

| | | |
|---|---|---|
| 2008/0205439 A1 | 8/2008 | Li et al. |
| 2010/0188129 A1* | 7/2010 | Ma .............................. G06F 1/04 327/294 |
| 2010/0191894 A1* | 7/2010 | Bartley ................. G06F 11/201 711/5 |
| 2013/0336080 A1* | 12/2013 | Frans ...................... G11C 7/222 365/226 |
| 2014/0198810 A1 | 7/2014 | Jones et al. |
| 2014/0281783 A1* | 9/2014 | Hodges ................. H04L 1/1874 714/749 |
| 2016/0154449 A1* | 6/2016 | Lim ...................... G06F 1/3296 713/322 |

* cited by examiner

MEMORY SYSTEM WITH MULTIPLE CHANNEL INTERFACES AND METHOD OF OPERATING SAME

CROSS-REFERENCE TO RELATED APPLICATION

This application claims the benefit of Korean Patent Application No. 10-2015-0049074 filed on Apr. 7, 2015, the disclosure of which is hereby incorporated by reference in its entirety.

BACKGROUND

The inventive concept relates to memory systems and methods of operating a memory system. More particularly, the inventive concept relates to memory systems providing improved reliability of operations and method of operating such a memory system.

The data input/output (I/O) speeds required by contemporary memory systems have increased over time. As a result of increased data I/O speeds, the occurrence of data errors has also increased. For example, as data I/O speeds increase, inter-symbol interference (ISI) and power noise tend to increase the number of undetected and/or erroneously detected data bits arising as the result of read/write operations performed by the constituent memory system.

SUMMARY

The inventive concept provides memory systems with better immunity to data errors. That is, the inventive concept provides memory systems capable of executing read/write operations with improved reliability. The inventive concept also provides methods of operating a memory system such that fewer data errors are generated.

According to an aspect of the inventive concept, there is provided a memory system including; a memory controller comprising a plurality of channel interfaces including a first channel interface and a second channel interface, a plurality of memories including a first memory group and a second memory group, a plurality of channels including a first channel connected to the first memory group and a second channel connected to the second memory group, and a plurality of channel interfaces disposed in the memory controller including a first channel interface and a second channel interface, wherein the first channel interface communicates first signals to the first memory group via the first channel synchronously with a first slave clock and the second channel interface communicates second signals to the second memory group via the second channel synchronously with a second slave clock having a different phase than the first slave clock, and the first slave clock is derived from a first input clock and the second slave clock is derived from a second input clock.

According to an aspect of the inventive concept, there is provided a memory system including; a memory controller comprising a plurality of channel interfaces including a first channel interface and a second channel interface, a plurality of memories including a first memory group and a second memory group, a plurality of channels including a first channel connected to the first memory group and a second channel connected to the second memory group, and a plurality of channel interfaces disposed in the memory controller including a first channel interface and a second channel interface. The first channel interface includes; first clock modulator that receives a first input clock and applies a first modulation to a first input clock to generate a first slave clock, a first first-in-first-out (FIFO) buffer that receives and stores at least one of first control, address and data (CAD) signals, and a first transmitter/receiver (Tx/Rx) that receives the first CAD signals from the FIFO buffer and synchronously controls the communication of the first CAD signals to the first memory group via the first channel in response to the first slave clock. The second channel interface includes a second clock modulator that receives a second input clock and applies a second modulation to a second input clock to generate a second slave clock, different from the first slave clock, a second FIFO buffer that receives and stores at least one of second CAD signals, and a second Tx/Rx that receives the second CAD signals from the second FIFO buffer and synchronously controls the communication of the second CAD signals to the second memory group via the second channel in response to the second slave clock.

According to an aspect of the inventive concept, there is provided

A solid state drive (SSD) including; a plurality of flash memory groups respectively connected to one of a plurality of channel interfaces disposed in a SSD controller via a corresponding one of a plurality of channels, wherein each one of the plurality of channel interfaces is configured to receive an input clock, generate a slave clock from the input clock, and synchronously communicate in response to the slave clock at least one of control, address and data (CAD) signals from the SSD controller to the flash memory group connected via the corresponding channel.

BRIEF DESCRIPTION OF THE DRAWINGS

Embodiments of the inventive concept will be more clearly understood from the following detailed description taken in conjunction with the accompanying drawings in which.

DETAILED DESCRIPTION

Hereinafter, one or more embodiments of the inventive concept will be described with reference to accompanying drawings. Throughout the drawings and written description, like reference numbers and labels are used to denote like or similar elements. As used herein, the term "and/or" includes any and all combinations of one or more of the associated listed items. Expressions such as "at least one of", when preceding a list of elements, modify the entire list of elements and do not modify the individual elements of the list.

Figure 1:
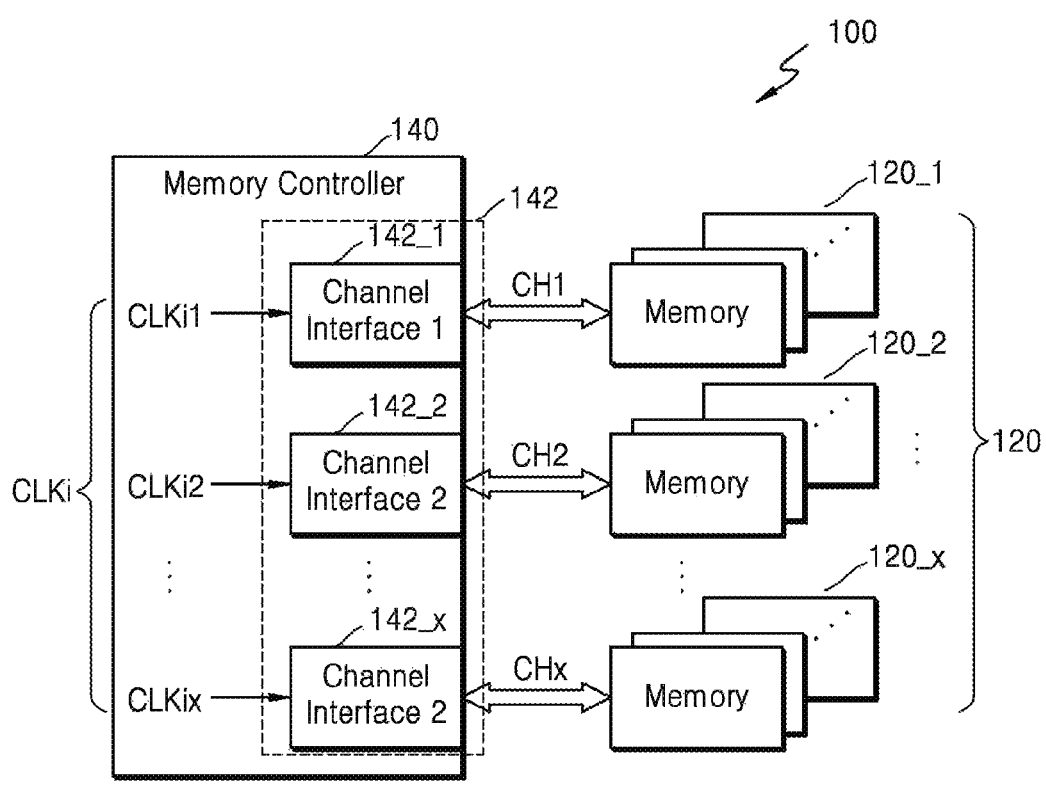
FIG. 1 is a block diagram illustrating a memory system according to an embodiment of the inventive concept.

FIG. 1 is a block diagram of a memory system 100 according to an embodiment of the inventive concept. Referring to FIG. 1, the memory system 100 generally includes a plurality of memories 120 and a memory controller 140 connected to the plurality of memories 120 via a plurality of channels (e.g., channels CH1, CH2 . . . to CHx—hereafter, collectively referred to as channels CH1 to CHx). In the illustrated embodiment of FIG. 1, each one of the plurality of memories 120 is respectively connected to one of the plurality of channels CH1 to CHx. However, in different embodiments of the inventive concept, two (2) or more memories from the plurality of memories 120 may be connected to a single channel or commonly connected to multiple channels. Hereinafter, the memories commonly connected to the same channel may be referred to as a "memory group". Here, the plurality of memories 120 may include memories of similar or differing type, operating characteristics, physical form factors, data storage capacity, etc.

Figure 2:
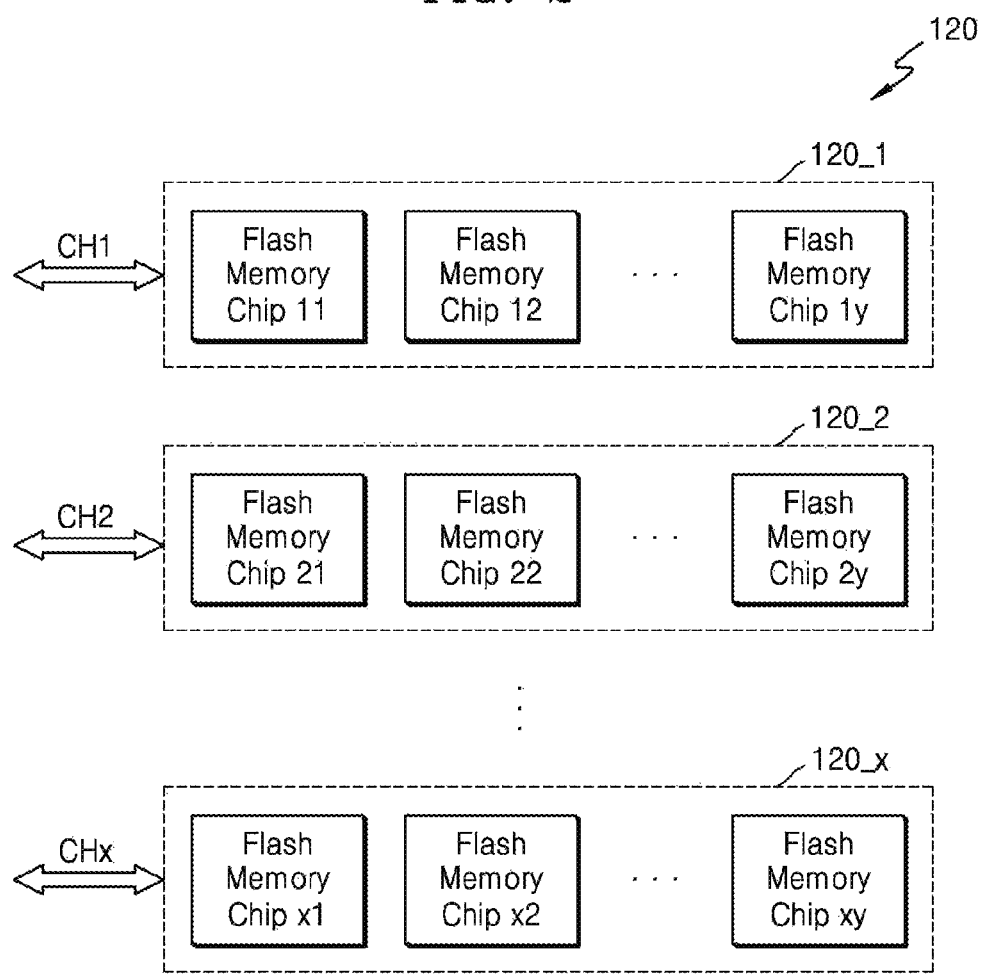
FIG. 2 is a block diagram further illustrating in one example the plurality of memories shown in FIG. 1.

FIG. 2 is a block diagram further illustrating in one example the plurality of memories 120 of FIG. 1. Referring to FIG. 2, each of the plurality of memories 120 may include one or more flash memory chip(s) (e.g., NAND-type flash memory, NOR-type flash memory, single level flash memory cells (SLC, multi-level memory cells (MLC), etc.) commonly connected in a flash memory group to one of the plurality of channels CH1 to CHx. The flash memory chips in each flash memory group connected to a respective channel may be controlled (i.e., operated or driven) independently from each other. For example, a first flash memory group 120_1 (e.g., including flash memory chip 11 through flash memory chip 1y) connected to a first channel CH1, and a second flash memory group 120_2 (e.g., including flash memory chip 21 through flash memory chip 2y) connected to a second channel CH2 may independently operated.

In certain embodiments of the inventive concept, the memory system 100 of FIG. 1 including the plurality of memories 120 shown in FIG. 2 may be formed as a Solid State Drive (SSD). FIG. 2 shows an example wherein all of the memories in the plurality of memories 120 are flash memory chips. However, those skilled in the art will understand that this need not always be the case, and that the scope of the inventive concept extends to many memory types and/or combinations thereof. For example, the plurality of memories 120 may include one or more types of volatile memory and/or one or more types of non-volatile memory. The choice of flash memory in FIG. 2 is merely exemplary.

Referring back to FIG. 1, the memory controller 140 includes a plurality of channel interfaces 142. Each channel interface in the plurality of channel interfaces 142 may be electrically connected (hereafter, "connected" for the sake of brevity) to one of the plurality of channels CH1 to CHx. For example, the first flash memory group 120_1 and a first channel interfaces 142_1 are connected to the first channel CH1, and the second flash memory group 120_2 and a second channel interfaces 142_2 are connected to the second channel CH2, etc.

At least one of the plurality of channel interfaces 142 may be used to "modulate" (i.e., change, vary or alter) an input clock CLKi, and synchronously (in relation to the input clock CLKi) transmit signals to and/or receive signals from one or more memories in the plurality of memories 120 via a corresponding channel. For example, the first channel interface 142_1 may be used to modulate a first input clock CLKi1 in order to synchronously transmit signals, commands and/or data to the first group memories 120_1 via the first channel CH1 in relation to a modulated first input clock CLKi1. In this context, the term "synchronization" may be understood as controlling the transmission (or receipt) of various signals in accordance with transition(s) (e.g., a rising edge and/or a falling edge) in a given synchronization signal (e.g., a clock signal, reference signal, or control signal).

For example, in certain embodiments of the inventive concept a synchronization signal may be a read enable (RE) signal or a write enable (WE) signal. Data being transmitted and/or received synchronously may include read commands, write or program commands, read data, write data, read addresses, write addresses, etc.—hereafter, singularly or collectively command/address/data or "CAD signal(s)". Hence, as will be appreciated by those skilled in the art, different synchronization signals may be used to synchronize the transmission and/or receipt (hereafter, "transmit/receipt") of CAD signal(s).

Like the first channel interface 142_1 described above, the second channel interface 142_2 may be used to modulate a second input clock CLKi2 in order to synchronously transmit/receive CAD signal(s) to/from the second group memories 120_2 via the second channel CH2 in relation to the modulated second input clock CLKi2, etc.

The input clocks CLKi may be externally provided and/or internally generated n relation to the memory controller 140. The respective input clocks CLKi may be similar or different in nature (e.g., frequency, amplitude, duty cycle, etc.) with respect to one another. For example, the various input clocks CLKi respectively applied to channel interfaces 142 may be similarly defined according to a master clock MCLK, an example of which is set forth herein with reference to FIG. 3. In certain embodiments of the inventive concept, one of the input clocks CLKi may be designated as the master clock MCLK, and all other input clocks CLKi may be derived therefrom (e.g., by selectively and uniquely delaying the master clock MCLK).

The plurality of channel interfaces 142 may be respectively utilized to control (or "set") a transition time point or a transmission speed for one or more CAD signal(s) being "communicated" (i.e., transmitted and/or received, or otherwise expressed inputted and/or outputted) via one or more of the channels CH1 to CHx. That is, the respective setting(s) of transition time(s) and/or transmission speed(s) may be accomplished by variously modulating the respective phases of the input clocks CLKi to define differing input clock frequencies. For example, in the memory system 100 of FIG. 1, at least two channel interfaces among the plurality of channel interfaces 142 may variously modulate a commonly provided input clock CLKi to have differing phases in order to set differing transition times for CAD signal(s) being communicated via a corresponding one of the channels CH1 to CHx. Hence, in certain embodiments of the inventive concept, the memory system 100 will include at least one channel interface among the plurality of channel interfaces 142 that modulates the frequency of its corresponding input clock CLKi differently from one time period to another time period in response to one or more environmental factors in order to control the transmission speed of CAD signal(s) being communicated by the at least one channel. Because of these abilities, memory systems according to embodiments of the inventive concept may significantly reduce inter-symbol interference (ISI), power noise interference effects, and/or electromagnetic interference (EMI) effects. As a result, memory systems designed and operated according to the inventive concept may communicate data at faster speeds while maintaining acceptable rates of errant data under a variety of environmental conditions and applications.

Figure 3:
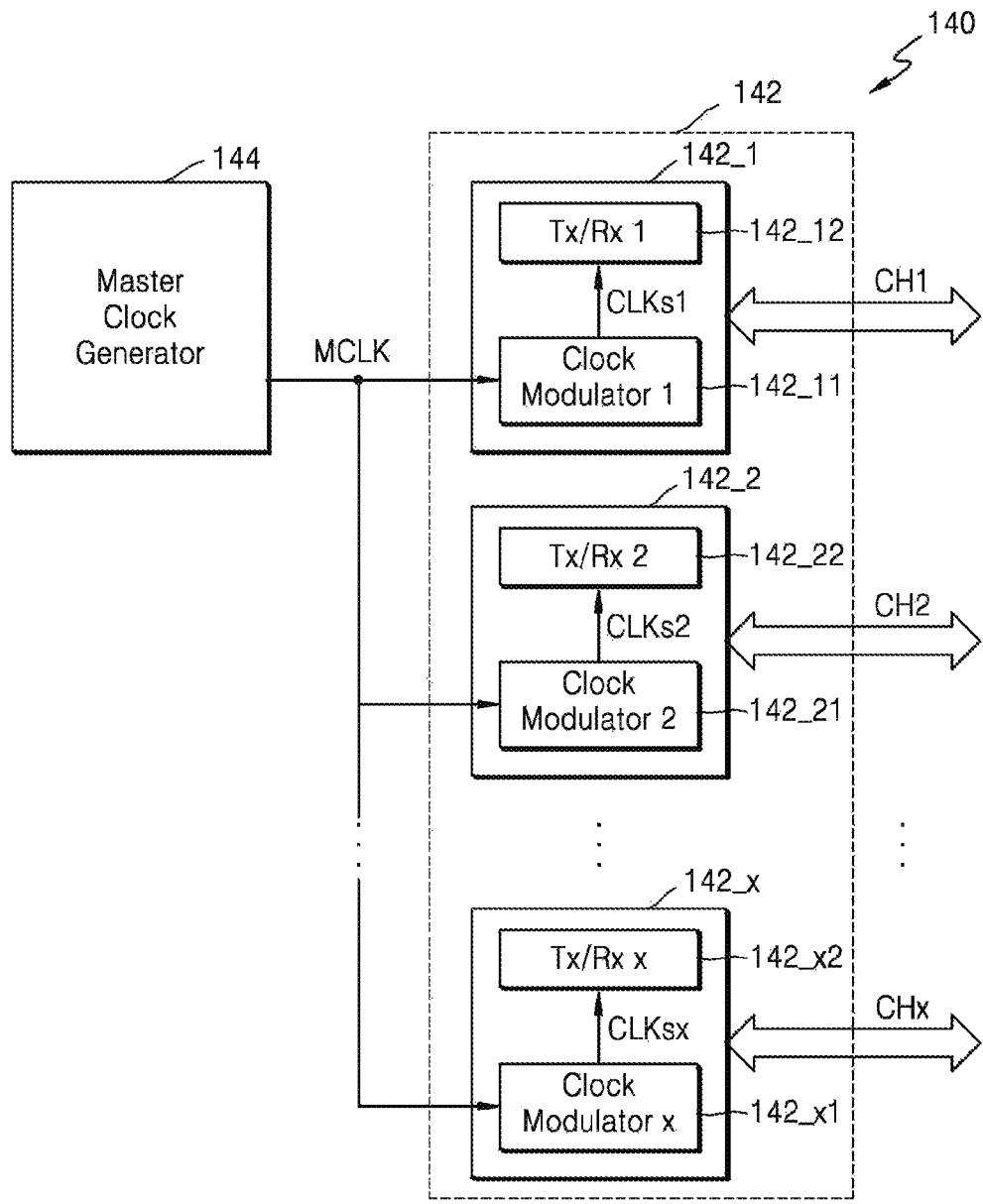
FIG. 3 is a block diagram further illustrating in one example the memory controller of FIG. 1.

FIG. 3 is a block diagram further illustrating in one example the memory controller 140 of FIG. 1. Referring to FIGS. 1 and 3, the memory controller 140 includes the plurality of channel interfaces 142 and a master clock generator 144. Each of the plurality of channel interfaces 142 receives the master clock MCLK generated by the master clock generator 144 as an input clock CLKi. Here, the master clock MCLK is a clock signal controlling the synchronous communication of CAD signal(s) to/from the plurality of memories 120. For example, the first channel interface 142_1 receives the master clock MCLK as the first input clock CLKi1, the second channel interface 142_2 receive the master clock MCLK as the second input clock CLKi2, etc.

The plurality of channel interfaces 142 may respectively include clock modulators 142_11 through 142_x1, that are respectively used to modulate the applied master clock MCLK. That is, in the illustrated embodiment of FIG. 3, the input clock signals CLKi1 through CLKix are respectively converted into slave clocks CLKs1 through CLKsx. Corresponding transmitter/receivers (Tx/Rx) 142_12 through 142_x2 used to synchronously communicate CAD signal(s) via respective channels CH1 through CHx connected via respective channel interfaces 142 in relation to a corresponding one of the slave clocks CLKs1 through CLKsx. For example, the first channel interface 142_1 includes a first clock modulator 142_11 that receives the master clock MCLK as the first input clock CLKi1 and modulates the input clock CLKi1 to provide a first slave clock CLKs1. The first channel interface 142_1 also includes a first Tx/Rx 142_12 synchronously communicating first CAD signal(s) via the first channel CH1 in relation to (i.e., under the control of) the first slave clock CLKs1. The other channel interfaces, Tx/Rx units, channels and slave clocks operate similarly.

The clock modulators 142_11 through 142_x1 may generate the respective slave clocks CLKs1 through CLKsx by modulating the phase or frequency of the applied master clock MCLK. In this manner, the clock modulators 142_11 through 142_x1 of the channel interfaces 142 may generate the slave clocks CLKs1 through CLKsx with differing phases or frequencies by uniquely modulating the phase or frequency of the master clock MCLK. This approach will be described in some additional detail hereafter.

Figure 4:
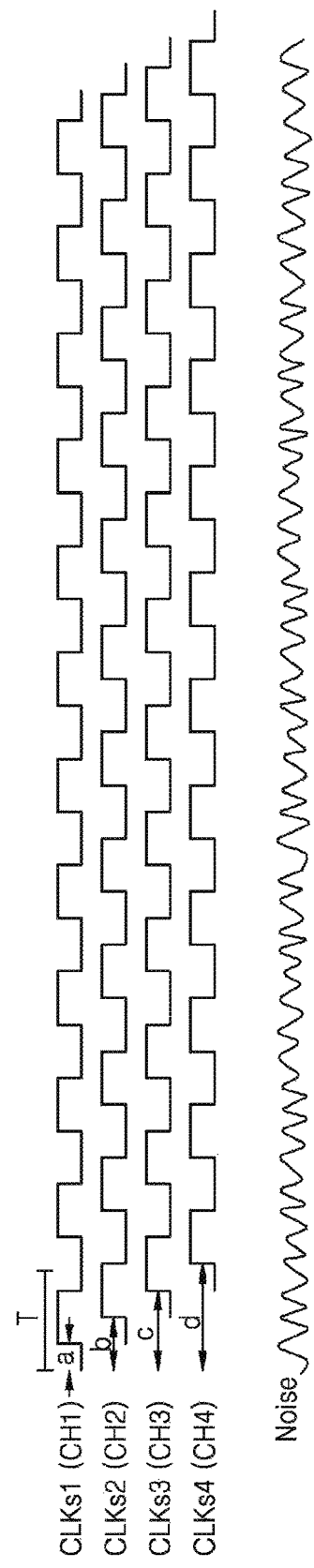
FIG. 4 is a timing diagram showing an example of a slave clock according to an embodiment of the inventive concept.

FIG. 4 is a timing diagram illustrating one example of a slave clock according to an embodiment of the inventive concept. Referring to FIGS. 3 and 4, the memory system 100 is assumed to include only four (4) channels CH1 to CH4 for the sake of simplicity. Hence, the memory controller 140 includes four channel interfaces 142 including; (1) a first channel interface 142_1 generating a first slave clock CLKs1 by delaying the master clock MCLK by as much as a first phase shift 'a'; (2) a second channel interface 142_2 generating a second slave clock CLKs2 by delaying the master clock MCLK by as much as a second phase shift 'b'; (3) a third channel interface 142_3 generating a third slave clock CLKs3 by delaying the master clock MCLK by as much as a third phase shift phase 'c'; and (4) a fourth channel interface CH4 generating a fourth slave clock CLKs4 by delaying the master clock MCLK by as much as a fourth phase shift 'd'. Here, the third and fourth channel interfaces 142_3 and 142_4 are implied within in FIGS. 1 and 2.

Here, the first through fourth (maximum) phase shifts a, b, c, and d may be set, such that first through fourth slave clocks CLKs1 to CLKs4 have four differently defined phases with respect to a common slave clock period 'T', as defined by the master clock MCLK. When CAD signal(s) are communicated in response to corresponding slave clocks CLKs1 through CLKs4 via corresponding channels CH1 through CH4, respective CAD signal transition times across the channels CH1 through CH4 will be different from each other, as shown in FIG. 4. This outcome reduces overall power noise.

In general with respect to FIGS. 3 and 4, the signal transitions associated with first, second, third and fourth CAD signals being respectively communicated via the first, second, third and fourth channels in the example of FIG. 3 are substantially more "skewed" (i.e., asynchronously dispersed in time) than analogous signal transitions associated with first, second, third and fourth CAD signals being respectively communicated via the first, second, third and fourth channels in the example of FIG. 4.

Figure 5:
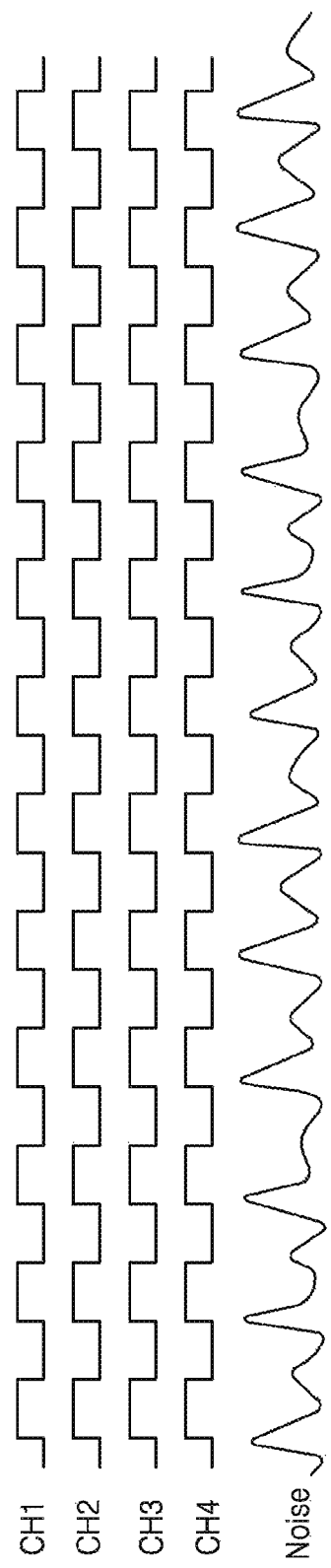
FIG. 5 is a timing diagram showing a comparative example of simultaneous slave clocks with reference to the example of FIG. 4.

FIG. 5 is a timing diagram illustrating a comparative example of simultaneous (or all the same) slave clocks with respect to the foregoing example illustrated in FIG. 4. Referring to FIG. 5, transition times for the CAD signals communicated via the channels CH1 through CH4 are largely simultaneous in occurrence. Thus, sharp and large peaks in power noise are more prevalent in the example of FIG. 5 as compared with the example of FIG. 4. By comparison, more varied transition times for CAD signals being communicated via the channels tend to reduce the resulting cumulatively occurring power noise and/or EMI. Accordingly, data being communicated by the plurality of memories 120 and memory controller 140 of FIGS. 1 through 4 suffers from relatively fewer data errors.

Figure 6:
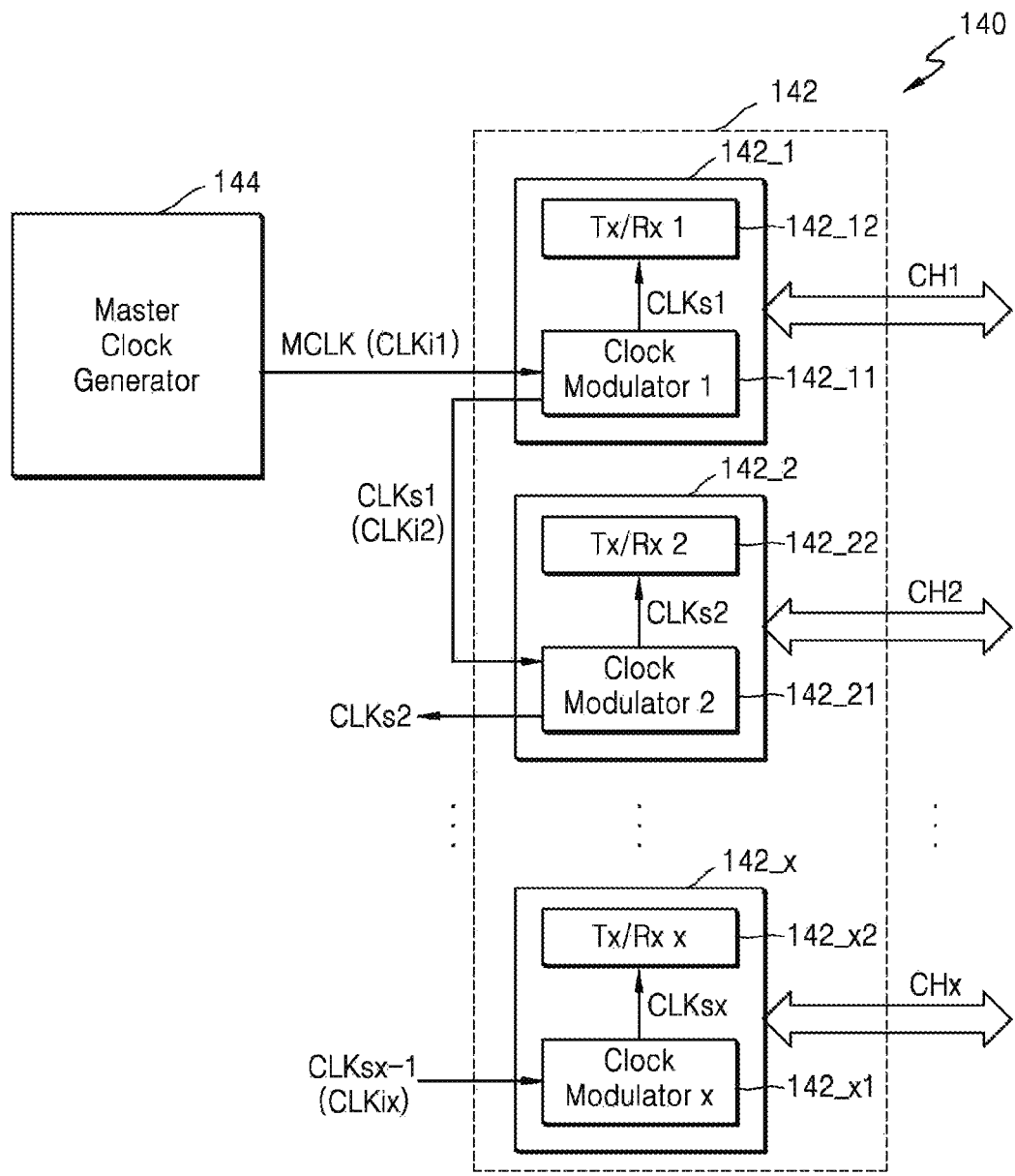
FIGS. 6, 7, 8 and 9 are respective block diagrams variously illustrating the memory controller of FIG. 1 according to different embodiments of the inventive concept.

FIG. 6 is a block diagram illustrating the memory controller 140 of FIG. 1 according to another embodiment of inventive concept. Referring to FIG. 6, the memory controller 140 again includes the plurality of channel interfaces 142 and master clock generator 144. However, between successive channel interfaces 142, each respective clock modulator (e.g., 142_11 through 142_x2) is configured and operated to transmit its modulated input clock—as a "previous input clock"—to a following clock modulator. Thus, each previous input clock received from a preceding clock modulator may be used as an input clock and modulated to provide a corresponding slave clock. In effect, successive clock modulators 142-11 through 142_x1-1 are daisy changed together to generate a cascade of corresponding slave clocks CLKs1 through CLKsx.

For example, the first channel interface 142_1 includes the first clock modulator 142_11 receiving the first input clock CLKi1 and modulating the first input clock CLKi1 into the first slave clock CLKs1. As a result and as before, the first Tx/Rx 142_12 is able to communicate first CAD signals via the first channel CH1 synchronously with the first slave clock CLKs1. However, the resulting first slave clock CLKs1 is then passed to the second clock modulator 142_21 as a second input clock CLKi2. Thereafter, the second clock modulator 142_21 may modulate the second input clock CLKi2 to generate the second slave clock CLKs2, and the second Tx/Rx 142_22 will communicate CAD signals via the second channel CH2 synchronously with the second slave clock CLKs2.

In this configuration, only the first input clock CLKi1 applied to the first channel interface 142_1 is the master clock MCLK. All other input clocks (e.g., CLKi2 through CLKisx-1) may be "internally provided" from another (e.g., a successively arranged) channel interface in an arrangement of channel interfaces. Those skilled in the art will understand from the foregoing that respective input clocks need not always be provided from a successive channel interface in a daisy-chain of channel interfaces. Other channel interface configurations and corresponding input clocks are contemplated by the inventive concept.

Figure 7:
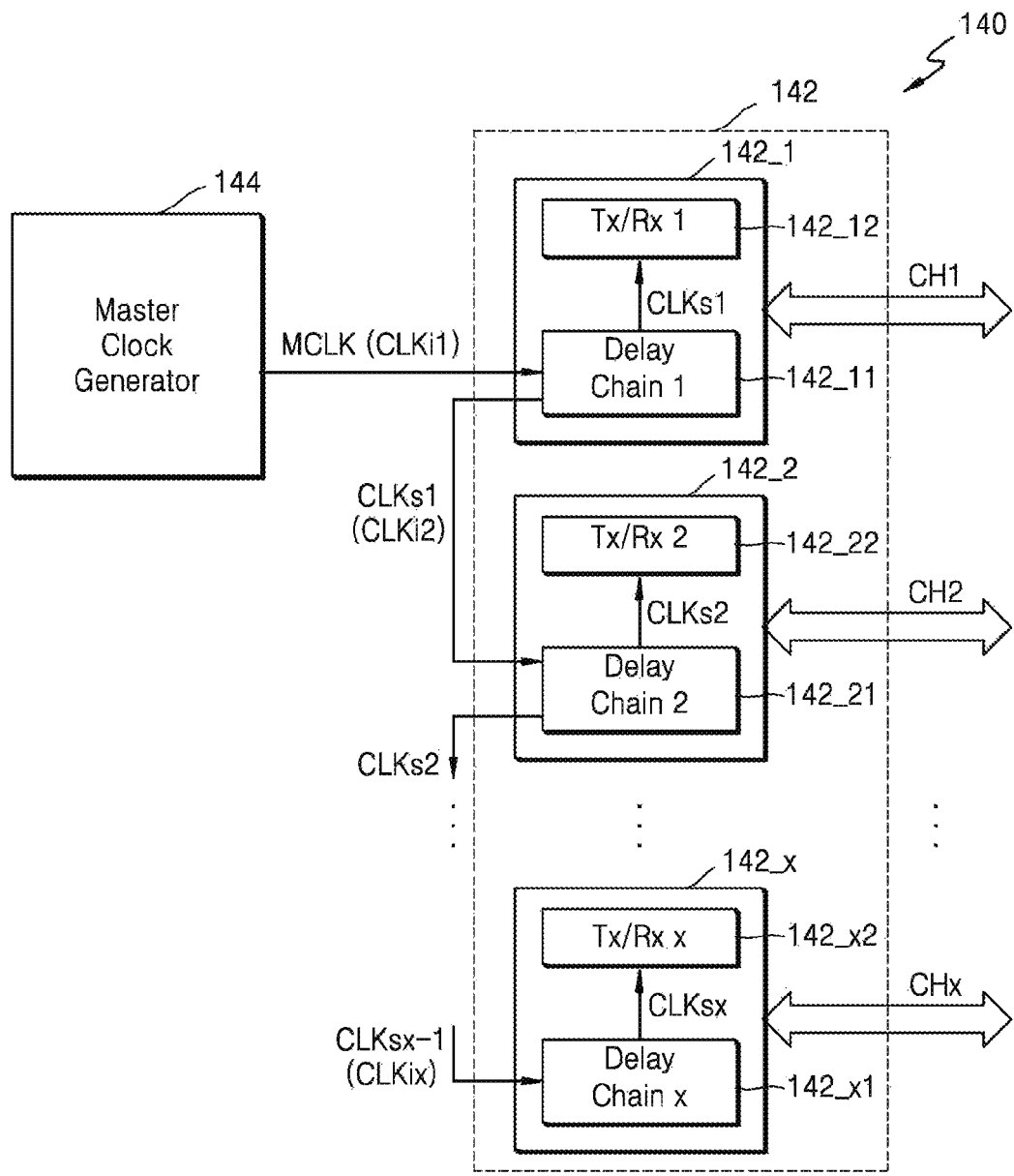
Figure 8:
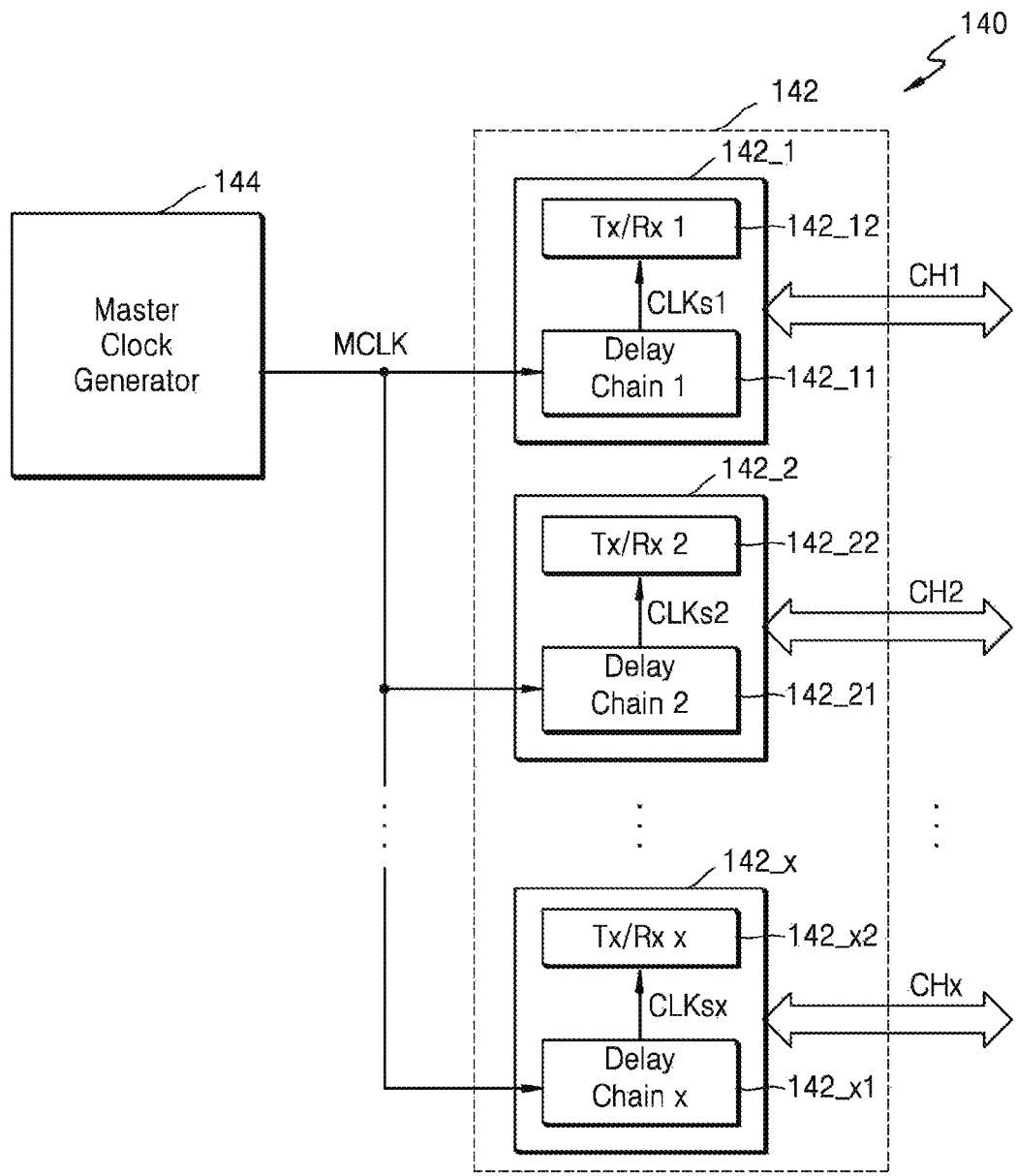

FIGS. 7 and 8 are respective block diagrams illustrating different examples of the memory controller 140 shown in FIG. 1 according to various embodiments of the inventive concept. Comparing the illustrated embodiments of FIGS. 6 and 7, and also comparing the illustrated embodiments of FIGS. 1 and 8, it may be understood that the previously described clock modulators (e.g., 142_11 through 142_x1) may be respectively replaced by delay chains (e.g., 142_11 through 142-x1). Here, each delay chain may be used to apply a prescribed delay to a corresponding input clock CLKi in order to generate a corresponding slave clock CLKs.

Each delay chain may include (e.g.,) a number of delay cells connected in series. For example, a first delay chain 142_11 may include a first number of delay cells, the second delay chain 142_21 may include a second number of delays cells (or a different type of delay cell), etc. By differently and uniquely configuring each delay chain, correspondingly different slave clocks may be generated.

Figure 9:
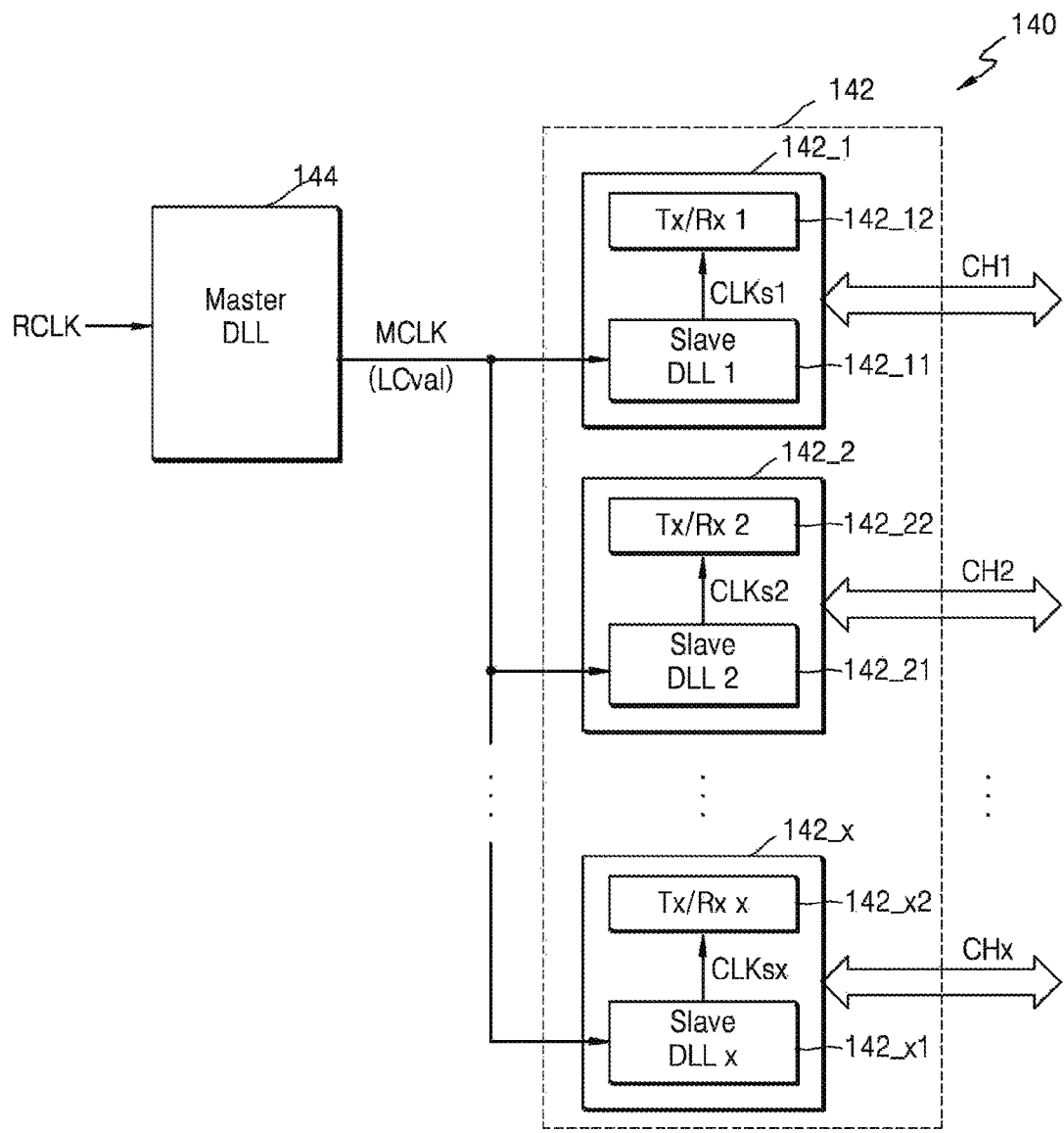

Comparing the illustrated embodiment of FIG. 9 to the embodiments illustrated in FIGS. 1 and 8, it will be understood that the clock modulators of FIG. 1 or the delay chains of FIG. 8 may be respectively replaced by a delay lock loops (DLLs). Thus, various approaches to generating a plurality of phase-differentiated slave clocks (e.g., CLKs1 through CLKsx) are contemplated within the inventive concept.

Here, the master clock generator 144 includes a master DLL, and each channel interface includes a slave DLL operating in response to a master clock (MCLK) or lock value (LCval) provided by the master DLL. In this regard, the master DLL may be used to detect a phase difference between an applied reference clock RCLK (e.g., a clock apparent in the operation of the memory controller 140) and a "delay clock" obtained by delaying the reference clock RCLK. This difference may then be used to select a number of delay cells required to obtain a zero (or otherwise defined) phase difference (e.g., the lock value (LCval)). Hence, if a phase difference between the reference clock RCLK and the delay clock is 0, it may represent that the phase difference between the reference clock RCLK and the delay clock is 360°. For example, if the number of delay cells required to make the phase difference between the reference clock RCLK and the delay clock 0 is 100, it may be determined that one delay cell causes a phase shift of 3.6°. Extending this example, a lock value (LCval) of 100 may be output as a result.

It may be further assumed that the slave DLLs used in place of the clock modulators 142_11 through 142_x1 receive the lock value (LCval) and modulate their input clock to generate corresponding slave clocks CLKs1 through CLKsx, each having a different phase. For example, the first slave DLL generating the first slave clock CLKs1 may be set to have a phase difference of 90° from the master clock MCLK. As assumed above, if each delay cell causes the phase shift of 3.6°, the first slave DLL properly delays the master clock MCLK by using twenty-five (25) delay cells in order to generate the first slave clock CLKs1.

Each of the plurality of delay cells may be connected in series and used to delay the phase of the reference signal provided by the master DLL, or in each of the slave DLLs may be formed of a pair of inverters, but is not limited thereto. The master DLL or each slave DLL may include delay cells, each including the pair of inverters that are connected in parallel, in order to modulate signal frequency. Assuming that the delay cells are connected in series, each slave DLL may generate a corresponding slave clock (e.g., CLKs1 through CLKsx) by selectively using the delay cells, a number of which corresponds to the frequency of the master clock MCLK. For example, if a lock value LCval representing 200 MHz is 50, that is, if the number of delay cells used to generate the master clock MCLK having a frequency of 200 MHz is 50, the first slave DLL may output the first slave clock CLKs1 having a frequency of 100 MHz by using 100 delay cells.

Figure 10:
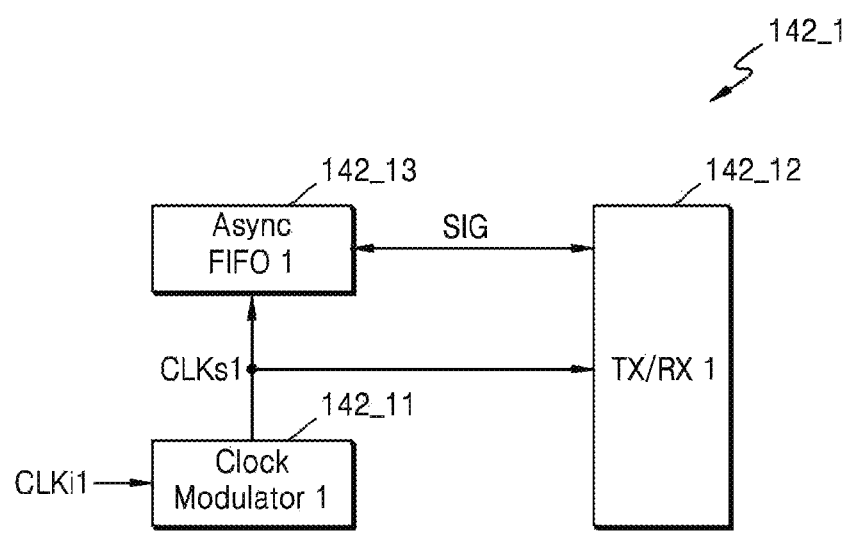
FIG. 10 is a block diagram further illustrating in one example the first channel interface of FIGS. 6, 7, 8, and 9 according to an embodiment of the inventive concept.
Figure 15:
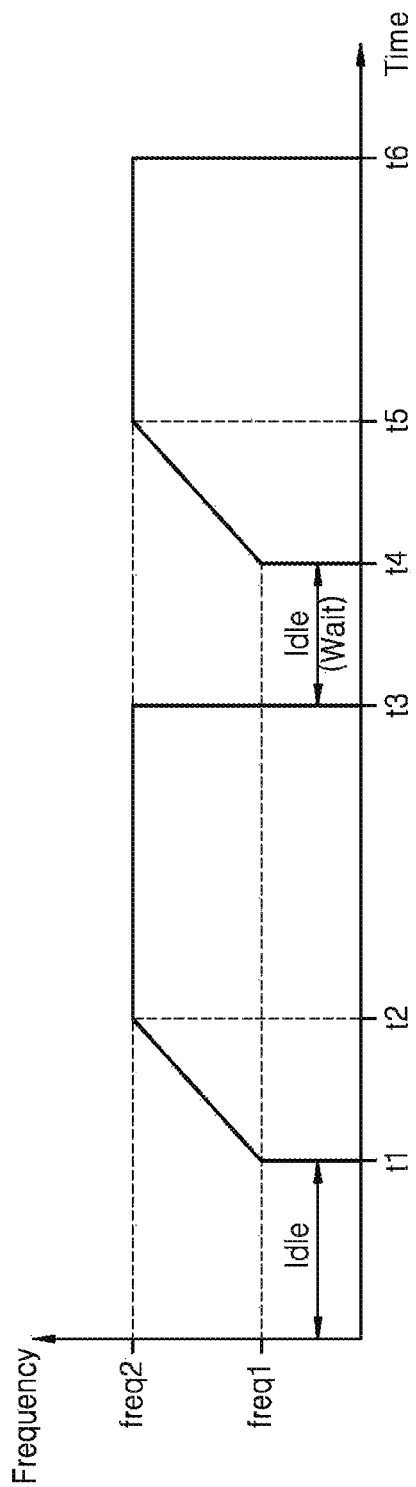
FIG. 15 is a signal timing diagram illustrating a slave clock according to an embodiment of the inventive concept.

FIG. 10 is a block diagram further illustrating in one example the first channel interface 142_1 of FIGS. 3 and 6-9 according to embodiments of the inventive concept. Referring to FIG. 10, the first channel interface 142_1 includes the first clock modulator 142_11, the first Tx/Rx 142_12, and a first asynchronous First-In-First-Out (FIFO) buffer 142-13. The first clock modulator 142_11 is used to modulate the first input clock CLKi1 to generate the first slave clock CLKs1. For example, as described above, the first clock modulator 142_11 may modulate the phase of the first input clock CLKi1. However, one or more embodiments are not limited thereto, that is, the first clock modulator 142_11 may modulate the frequency of the first input clock CLKi1 to generate the first slave clock CLKs1, as shown in FIG. 15 that will be described later.

The first slave clock CLKs1 is transmitted to the first Tx/Rx 142_12 and the first asynchronous FIFO buffer 142_13. The first Tx/Rx 142_12 communicates CAD signals synchronously with respect to the first slave clock CLKs1. Here, the CAD signals communicated by the first Tx/Rx 142_12 may be input to the first asynchronous FIFO buffer 142_13. For example, the first asynchronous FIFO buffer 142_13 may output a synchronization signal RE to the first Tx/Rx 142_12 on a rising edge of the first slave clock CLKs1. In this case, the first Tx/Rx 142_12 may output the synchronization signal RE to the first channel CH1 on the rising edge of the first slave clock CLKs1. The first asynchronous FIFO buffer 142_13 of FIG. 10 may include a transmission FIFO for transmitting CAD signals to the first Tx/Rx 142_12 and a reception FIFO for receiving CAD signals from the first Tx/Rx 142_12. Moreover, the first asynchronous FIFO buffer 142_13 may be formed from data storage units configured in configurations other than a simple FIFO buffer.

The other channel interfaces 142_2 through 142_x illustrated in FIG. 1 may have the same structures as that of the first channel interface 142_1 of FIG. 10. As such, according to the memory system 100 of the embodiment, the times at which CAD signals are communicated via the different channels may be differently set so that power noise and/or EMI may be reduced and the memory system 100 operated more reliably.

Figure 11:
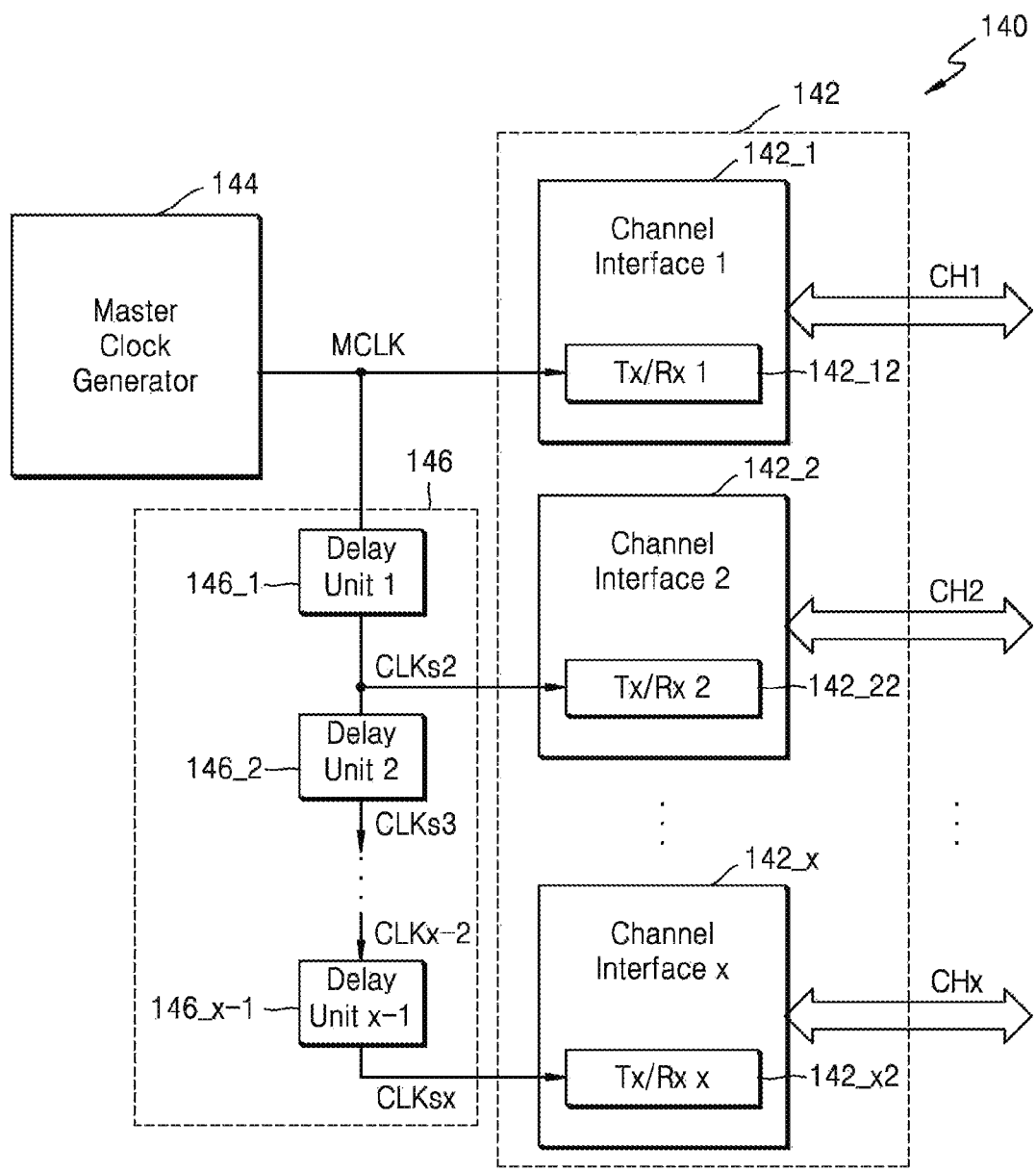
FIG. 11 is a block diagram illustrating the memory controller of FIG. 1 according to another embodiment of the inventive concept.

In the above description, examples in which the channel interfaces 142 include the clock modulators to generate the slave clocks CLKs having different phases with respect to the master clock MCLK are described. However, one or more embodiments are not limited thereto. Referring to FIG. 11 in which the memory controller 140 according to an embodiment is shown, the memory controller 140 may further include a plurality of delay units 146. Each of the plurality of delay units 146 delays the input clock thereto and outputs the delayed clock. For example, a first delay unit 146_1 delays the master clock MCLK to generate a second slave clock CLKs2, and a second delay unit 146_2 delays the second slave clock CLKs2 to output a third slave clock CLKs3. Likewise, an x-1st delay unit 146_x-1 may delay an x-1st slave clock CLKsx-1 to output an x-th slave clock CLKsx. Each of the first to x-1st delay units 146_1 to 146_x-1 may be formed of the delay cells that are connected in series. The number of delays cells included in each of the first to x-1st delay units 146_1 to 146_x-1 may be equal to or different from those of one another.

Respective outputs from the first delay unit 146_1 to the x-1st delay unit 146_x-1 may be input respectively to the second Tx/Rx 142_22 to the x-th Tx/Rx 142_x2 in the second channel interface 142_2 to the x-th channel interface 142_x. The second Tx/Rx 142_22 to the x-th Tx/Rx 142_x2 may transmit/receive the signal in synchronization with the second slave clock CLKs2 to the x-th slave clock CLKsx, respectively. In FIG. 11, the first Tx/Rx 142_12 is synchronized with the master clock MCLK that is not modulated or delayed, but is not limited thereto. The plurality of delay units 146 may include a delay unit for delaying the master clock MCLK to output the first slave clock CLKs1 described above. In this case, the first delay unit 146_1 may delay the first slave clock CLKs1 to output the second slave clock CLKs2.

Figure 12:
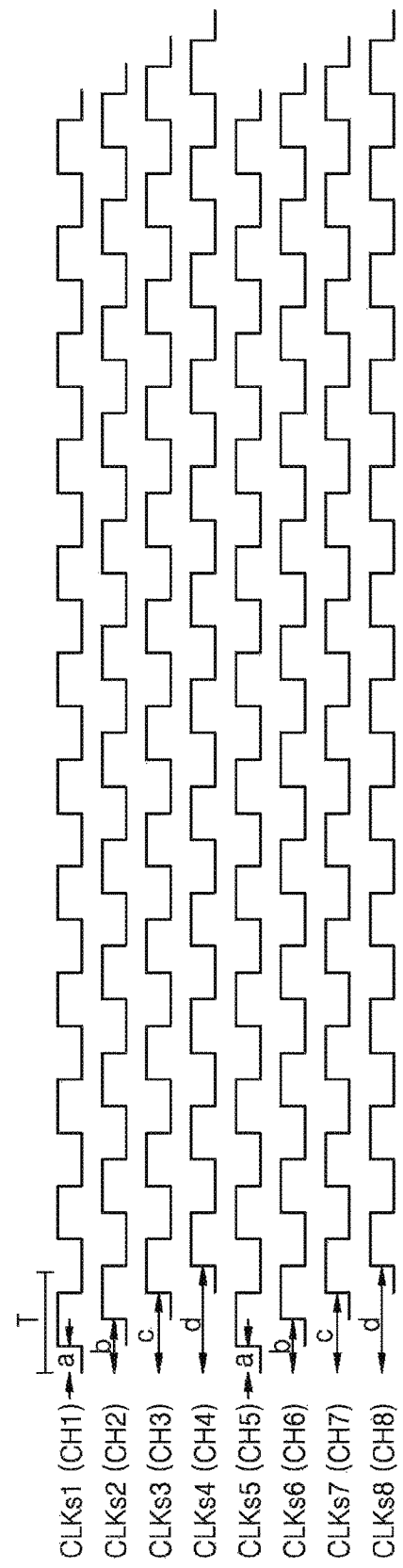
FIGS. 12 and 13 are timing diagrams illustrating examples of slave clocks according to one or more embodiments of the inventive concept.
Figure 13:
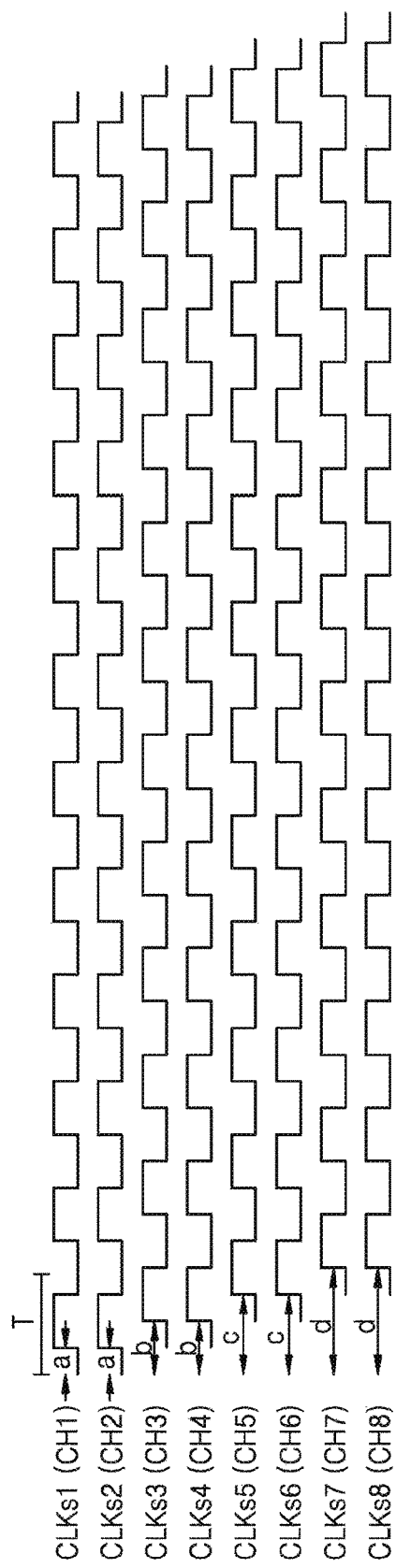

FIGS. 12 and 13 are respective timing diagrams illustrating examples of various slave clocks according to embodiments of the inventive concept. The illustrated examples of FIGS. 12 and 13 assume than the memory system 100 of FIG. 1 includes eight (8) channels CH1 through CH8, and the memory controller 140 includes eight (8) corresponding channel interfaces. In FIG. 12, the first slave clock CLKs1 through fourth slave clock CLKs4 are generated by delaying the master clock MCLK by as much as phase shifts a, b, c, and d, respectively. In addition, the fifth slave clocks CLKs5 through eighth slave clocks CLKs8 are generated by delaying the master clock MCLK by as much as phase shifts a, b, c, and d, respectively.

In FIG. 13, the first slave clock CLKs1 and second slave clock CLKs2 are generated by delaying the master clock MCLK by as much as the first phase shift a; the third slave clock CLKs3 and fourth slave clock CLKs4 are generated by delaying the master clock MCLK by as much as the second phase shift b; the fifth slave clock CLKs5 and sixth slave clock CLKs6 are generated by delaying the master clock MCLK by as much as the third phase shift c; and the seventh slave clock CLKs7 and eight slave clock CLKs8 are generated by delaying the master clock MCLK by as much as the fourth phase shift d, respectively.

During a period T for the master clock MCLK, the first through fourth phase shifts a, b, c, and d may be set so that four pairs of slave clocks from among the first through eighth slave clocks CLKs1 to CLKs8 have four (4) respect phases that are different from one another. Therefore, the communication of CAD signals will not occur simultaneously across channels CH1 through CH8. This approach tends to reduce overall power noise and/or EMI.

In order to reduce power noise and/or EMI, the memory system 100 may set signal transition points for signals being communicated via the channels CH1 through CH8 to be different from one another as shown in FIG. 4. However, as shown in FIGS. 12 and 13, the transition points for CAD signals in some channels may be set to be the same as each other. Whether the transition points for CAD signals in all channels are set to be different or the transition points for CAD signals in some channels are set to be the same as each other may be set according to the noise tolerance of the memory system 100 in view of available resources.

Also, in a case where the transition points for CAD signals in some channels may be set different from each other, the channels in which the transition points of the signals are to be set different from each other or the channels in which the transition points of the signals are to be set equal to each other may be determined according to the interferences between the channels or characteristics of the memory groups connected to the channels CH1 through CH8. Also, in some channels, a CAD signal that is synchronized with the slave clock, the phase of which is equal to that of the master clock MCLK, may be transmitted and received. For example, in FIGS. 4, 12, and 13, the first slave clock CLKs1 is delayed from the master clock MCLK by as much as the a first phase shift a, but the first slave clock CLKs1 may be generated to have the same phase as that of the master clock MCLK.

Figure 14:
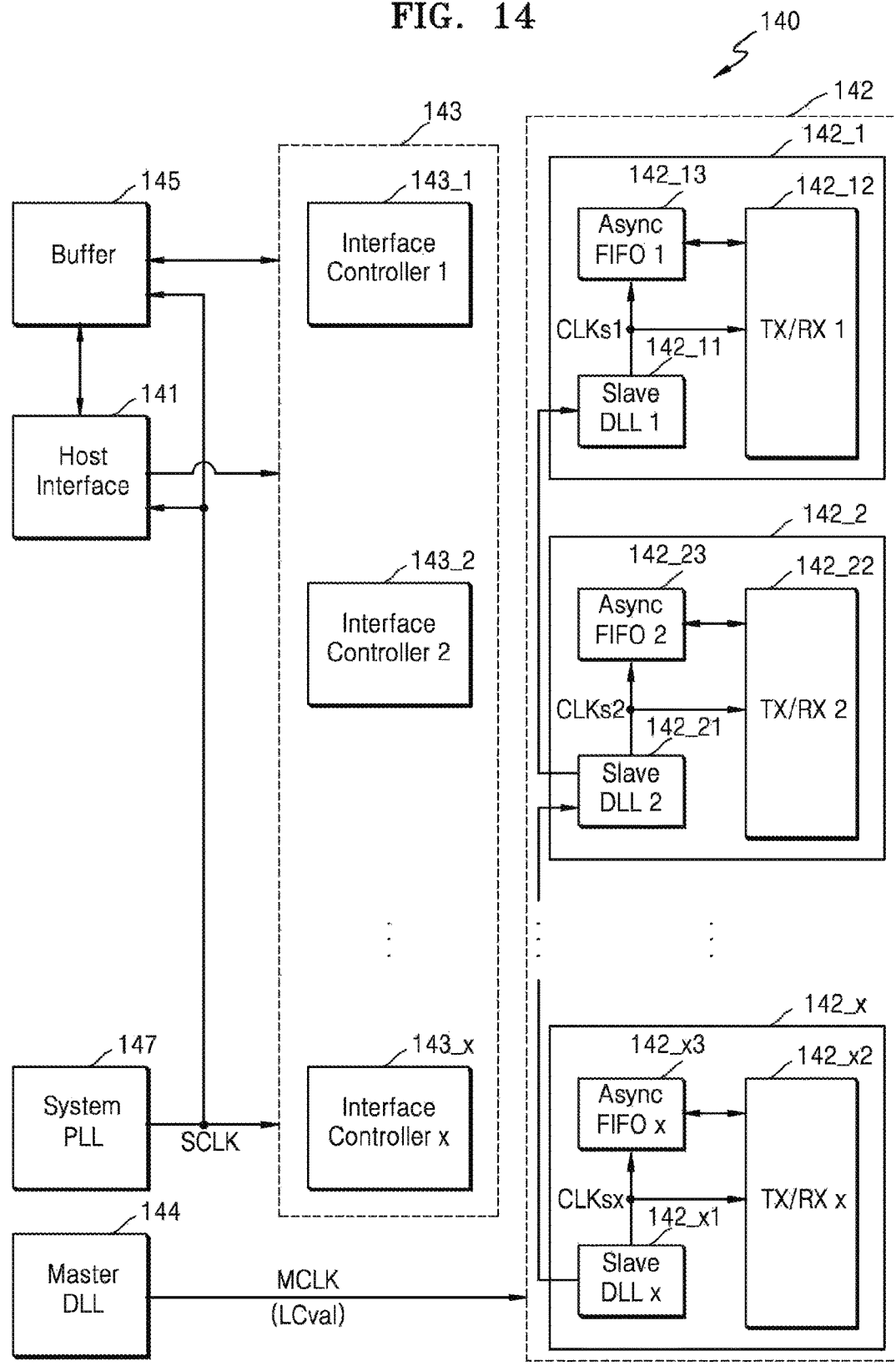
FIG. 14 is a bock diagram of a memory controller according to an embodiment of the inventive concept.

FIG. 14 is a block diagram further illustrating the memory controller 140 of FIG. 1 according to another embodiment of the inventive concept. Referring to FIGS. 3 and 14, the memory controller 140 includes a host interface 141, the channel interfaces 142, interface controllers 143, the master clock generator 144, a buffer 145, and a system phase lock loop (PLL) 147.

The host interface 141 implements an interface between an externally disposed host (not shown) and the memory system 100. For example, the host interface 141 may receive CAD signal(s) (e.g., including one or more of commands, control signals, control data, control packets, read data, write data, program data, logical addresses, physical addresses, address offsets, etc.) from the host (or from the memories) and transmit the CAD signal(s) to the plurality of memories (or to the host) via a serial advanced technology attachment (SATA), a universal serial bus (USB), a small computer system interface (SCSI), etc.

The channel interfaces 142 may exchange the signals with the plurality of memories 120 via the channels CH1 to CHx connected thereto. The channel interfaces 142 exemplary have the structures shown in FIG. 10. For example, the first channel interface 142_1 includes the first clock modulator 142_11, the first Tx/Rx 142_12, and the first asynchronous FIFO buffer 142_13. The first clock modulator 142_11 may modulate the first input clock CLKi1 to generate the first slave clock CLKs1. The first slave clock CLKs1 is transmitted to the first Tx/Rx 142_12 and the first asynchronous FIFO buffer 142_13. The first Tx/Rx 142_12 is synchronized with the first slave clock CLKs1 to communicate CAD signal(s). The CAD signal(s) communicated by the first Tx/Rx 142_12 may be input to the first asynchronous FIFO buffer 142_13. The second channel interface 142_2 to the x-th channel interface 142_x may have the same structures as that of the first channel interface 142_1. For example, the second channel interface 142_2 may include the second clock modulator 142_21, the second Tx/Rx 142_22, and the second asynchronous FIFO buffer 142_23. Likewise, the x-th channel interface 142_x includes the x-th clock modulator 142_x1, the x-th Tx/Rx 142_x2, and the x-th asynchronous FIFO buffer 142_x3.

The interface controllers 143 may be used to control the channel interfaces 142 according to commands passed via the host interface 141. For example, the interface controllers 143 may control the channel interfaces 142 so that the command or the data corresponding to the LBA input to the host interface 141 may be transmitted via the channel to which the memory corresponding to the LBA is connected. For example, a first interface controller 143_1 receives an LBA indicating the memory connected to the first channel CH1 and controls the first channel interface 142_1, and a second interface controller 143_2 receives an LBA indicating the memory connected to the second channel CH2 and controls the second channel interface 142_2. Likewise, an x-th interface controller 143_x receives an LBA indicating the memory connected to the x-th channel CHx and controls the x-th channel interface 142_x.

FIG. 14 shows an example in which the master clock generator 144 is formed as a master DLL. The master DLL formed as the master clock generator 144 generates the master clock MCLK to provide the channel interfaces 142 with the master clock MCLK. The master clock MCLK may be applied to all of the channel interfaces 142_1 to 142_x as shown in FIG. 3, or may be applied to only the first channel interface 142_1 as shown in FIG. 6. The master DLL formed as the master clock generator 144 may calculate a phase difference between a reference clock RCLK and a delay signal obtained by delaying the reference clock RCLK, or a lock value LCval corresponding to a frequency of the master clock MCLK. The buffer 145 temporarily stores CAD information received from or to be transmitted to the host interface 141. The CAD information stored in the buffer 145 may be transmitted to the interface controllers 143. The buffer 145 may temporarily store data transmitted from the interface controller 143, and may transmit the data to the host interface 141.

The system PLL 147 may generate a system clock SCLK that is an operating clock in the memory controller 140. The system clock SCLK is applied to the host interface 141, the interface controllers 143, and the buffer 145 so that operations in the memory controller 140 may be performed in synchronization with the system clock SCLK.

In the above description, the slave clocks having the different phases according to the channels are described above. Hereinafter, the slave clock generated by modulating the frequency of the master clock MCLK will be described below in detail.

FIG. 15 is a signal timing diagram showing frequencies for a slave clock according to an embodiment of the inventive concept. Referring to FIGS. 1, 3, and 15, the frequency of the input clock CLKi may be modulated differently according to time. For example, the first channel interface 142_1 may modulate the first input clock CLKi1 to a frequency between a first frequency freq1 and a second frequency freq2 during a period between time t1 and time t2, where time t1 indicates a time when the memory controller 140 is wakes-up from an idle state and time t2 is set according to a degree of expected interference between symbols in the first channel CH1. The first channel interface 142_1 may modulate the first input clock CLKi1 to the second frequency freq2 during the period between time t2 and time t3.

Here, time t3 may be a time when the memory controller 140 or the first channel interface 142_1 returns to the idle state. In this case, at a time t4 when the memory controller 140 enters a busy state, the first slave clock CLKs1— obtained by modulating the first input clock CLKi1—may be generated. The first channel interface 142_1 modulates the first input clock CLKi1 to a frequency between the first frequency freq1 and the second frequency req2 during a period between time t4 and time t5, and further modulates the first input clock CLKi2 to the second frequency freq2 during a period between time t5 and a time t6 to generate the first slave clock CLKs1. Here, the time t5 may be set according to a degree of expected interference between symbols of the CAD information being communicated via the first channel CH1, as in time t2. After time t6, the memory controller 140 may be in an idle state or a wait state.

Otherwise, time t3 may denote a time of entering the wait state. When the asynchronous FIFO buffers 142_13 through 142_x3 included respectively in the channel interfaces 142 become full or empty (or nearly full or nearly empty), the memory controller 140 or the channel interfaces 142 may enter the wait state with respect to the channels CH1 through CHx. The second channel interface 142_2 to the x-th channel interface 142_x may operate in the same manner as the first channel interface 142_1. The modulation of the input clock CLKi1 into the slave clock CLKs may be performed by the clock modulators 142_11 to 142_x1 included in the channel interfaces 142.

Figure 16:
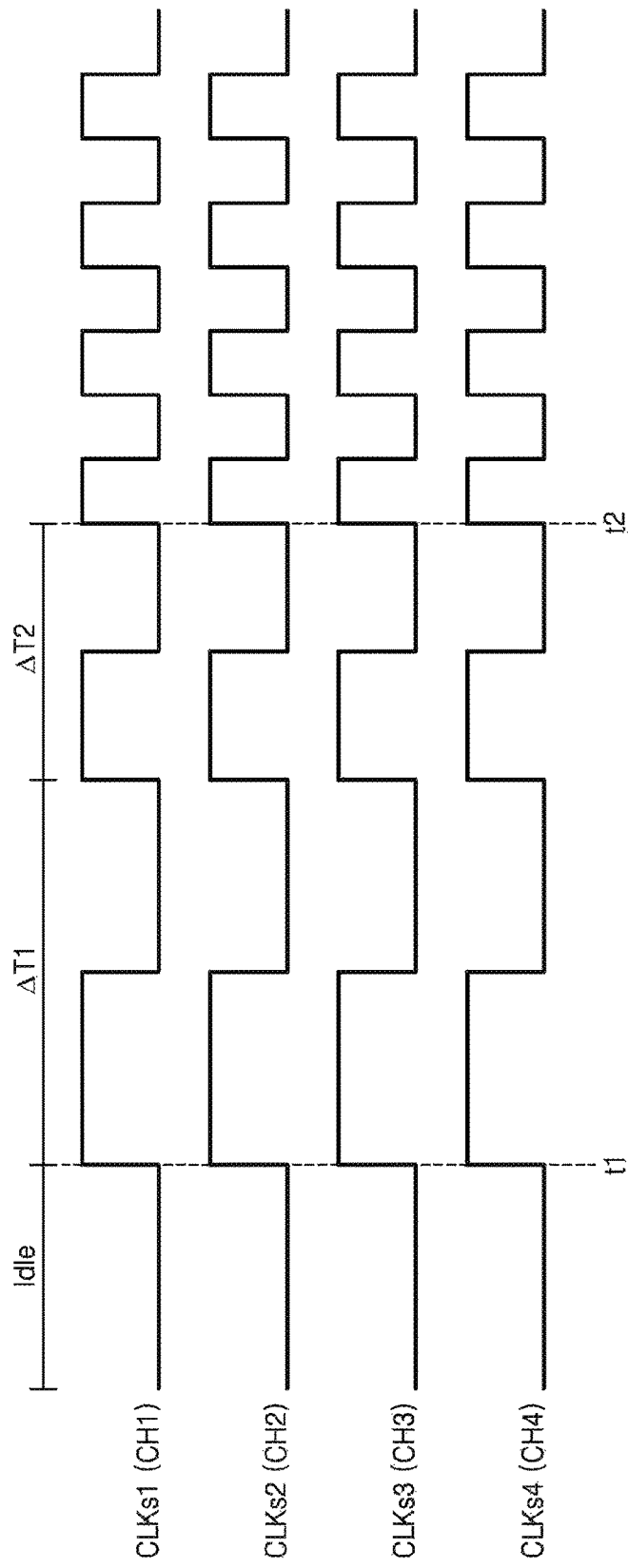
FIGS. 16 and 17 are respective signal timing diagrams illustrating various examples of a slave clock according to embodiments of the inventive concept.
Figure 17:
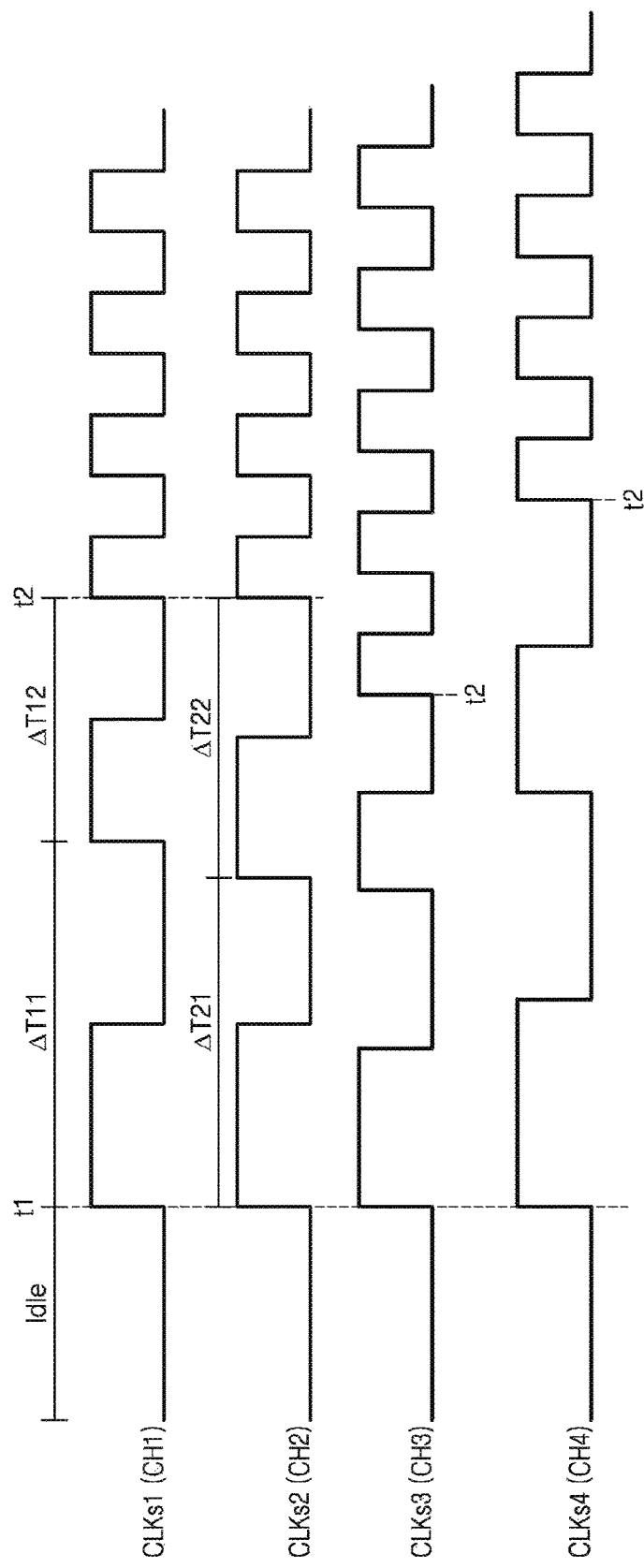

FIGS. 16 and 17 are respective signal timing diagrams illustrating examples of slave clocks according to embodiments of the inventive concept. FIGS. 16 and 17 assume that the memory system 100 includes only four (4) channels CH1 through CH4 and the memory controller 140 includes four (4) channel interfaces 142_1 to 142_4. In FIG. 16, the first slave clock CLKs1 may be generated during a period after time t2 faster than during a period between time t1 and time t2, and during a period between time t1 and time t2, the generation becomes faster gradually (T1>ΔT2). The period between time t1 and time t2 with respect to the slave clocks CLKs2 through CLKsx corresponding to the other channels CH2 through CH4 may be correspond to the period between time t1 and time t2 with respect to the first slave clock CLKs1.

However, one or more embodiments are not limited to the above example. As described above, since each of the memory groups of FIG. 2 may independently operate, environmental factors influencing the propagation of CAD signals via the channels CH1 through CHx may be different from each other. Therefore, as shown in FIG. 17, the periods between time t1 and time t2 with respect to the slave clocks CLKs1 to CLKsx corresponding to the channels CH1 through CH4 may be different from each other. For example, the periods between time t1 and time t2 with respect to the first slave clock CLKs1 and the second slave clock CLKs2 may be the same as each other, but the period between time t1 and time t2 with respect to the first slave clock CLKs1 and the second slave clock CLKs2 may be different from the periods between time t1 and time t2 with respect to the third slave clock CLKs3 and the fourth slave clock CLKs4. Also, even if the periods between time t1 and time t2 with respect to the first and second slave clocks CLKs1 and CLKs2 are the same as each other, increasing speeds in the periods between the time t1 and the time t2 may be different from each other ($\Delta T11 \neq \Delta T21$ and $\Delta T12 \neq \Delta T22$).

According to the memory system and the method of operating the memory system according to certain embodiments of the inventive concept, an initial pulse of a slave clock used to control communication of CAD signal(s) (or similar payload signals) via a channel may be initially generated to be low. Thus, erroneous data operations that occur when a plurality of memories do not detect information contained in the CAD signals because the magnitude(s) of initial pulses of the CAD signal(s) are small due to the interference between the symbols may be prevented. The symbols may indicate the pulses of the CAD signals exchanged via the channels. By generating the initial pulse of the slave clock to have a low frequency, even if the magnitude of the initial pulse of the signal exchanged through the channel is small due to the interference between the symbols, a time sufficient for the memory to properly detect the information of the CAD signal(s) is ensured, and accordingly, erroneous memory system operation is prevented.

Figure 18:
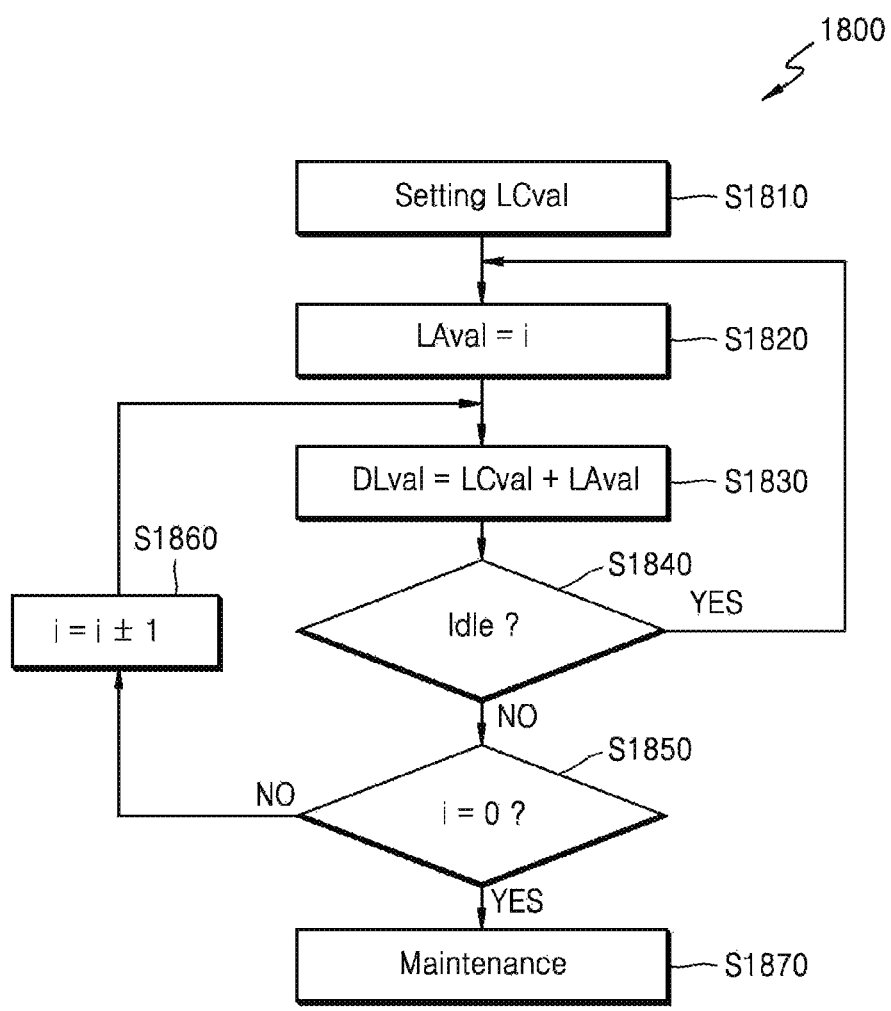
FIG. 18 is a flowchart summarizing a method of generating a slave clock according to an embodiment of the inventive concept.

FIG. 18 is a flowchart summarizing a method of generating a slave clock according to an embodiment of the inventive concept. For convenience of description, it is assumed that the method 1800 of generating the slave clock illustrated in FIG. 18 is performed in the memory controller 140 of FIG. 14. However, one or more embodiments are not limited thereto, and the method 1800 of generating the slave clock of FIG. 18 may be performed in the memory controllers according to other embodiments. Also, for convenience of description, the method 1800 of generating the slave clock shown in FIG. 18 is performed under an assumption that the master clock MCLK is applied to the first channel interface 142_1 and the other channel interfaces 142_2 to 142_x receive the slave clocks of previous channel interfaces as inputs. However, the method 1800 of generating the slave clock of FIG. 18 may be performed in a case where the master clock MCLK is applied to all the channel interfaces 142_1 to 142_x.

Referring to FIGS. 14 and 18, the method 1800 of generating the slave clock according to the embodiment includes setting the lock value LCval in the master clock generator 144 formed as the master DLL (S1810), initializing a loop adjustment value LAval of the first channel interface 142_1 as i (S1820), calculating a delay loop value DLval as a sum of the lock value LCval and the loop adjustment value LAval (S1830), and if the memory system 100 is not in the idle state (NO to S1840) and if the loop adjustment value LAval is not zero (NO to S1850), adjusting the loop adjustment value LAval (S1860), and repeating the calculation of the delay loop value DLval (S1830 to S1860).

When the frequency of the master clock MCLK input to the first channel interface 142_1 is modulated to generate the first slave clock CLKs1, the loop adjustment value LAval may indicate the number of delay cells in the delay chain of the first clock modulator 142_11 that is formed as the first slave DLL and may correspond to a range of frequency modulation of the master clock MCLK. For example, when a frequency difference between the master clock MCLK and the first slave clock CLKs1 is within a first range, if the first range corresponds to b delay cells in the delay chain of the first slave DLL, the loop adjustment value LAval may be set as b. For example, the first range may be a difference between the first frequency freq1 and the second frequency freq2 in the example of FIG. 15.

The delay loop value DLval is a value indicating whether how many delay cells in the delay chain of the first slave DLL have to be used in order for the first channel interface 142_1 to modulate the master clock MCLK to the first slave clock CLKs1. Therefore, the delay loop value DLval may be represented as a sum of the lock value LCval and the loop adjustment value LAval.

According to the method 1800 of FIG. 18, the loop adjustment value LAval is gradually adjusted to set the delay loop value DLval in order to gradually change the frequency of the first slave clock CLKs1 in an arbitrary time period or an arbitrary operating environment as shown in FIG. 15 (S1830 to S1860). The loop adjustment value LAval, that is, i, may be set as a positive value or a negative value. If the loop adjustment value LAval has a positive value, the loop adjustment value LAval is decreased by 1 (i=i−1) in operation S1860. If the loop adjustment value LAval has a negative value, the loop adjustment value LAval is increased by 1 (i=i+1) in operation S1860.

If the loop adjustment value LAval has a positive value, the delay loop value DLval may be gradually reduced through operations S1830 to S1860. Therefore, the frequency of the first slave clock CLKs1 becomes faster. However, if the loop adjustment value LAval has a negative value, the delay loop value DLval may be gradually increased through operations S1830 to S1860.

As described above with reference to FIG. 15, when the memory system 100 is in the idle state, an initialization is performed (NO to S1840). In addition, the loop adjustment value LAval is decreased (S1860), and when the loop adjustment value LAval becomes zero (YES to S1850), the frequency of the first slave clock CLKs1 is maintained (S1870). For example, in the example of FIG. 15, the loop adjustment value LAval becomes 0 in the period between the time t2 and the time t3, and thus, the first slave clock CLKs1 may be maintained at the second frequency freq2. In FIG. 18, it is determined that the memory system 100 (the memory controller or the channel interfaces) is in the idle state in operation S1840, but is not limited thereto, that is, it may be determined whether the memory system 100 is in the wait state as described with reference to FIG. 15.

Figure 19:
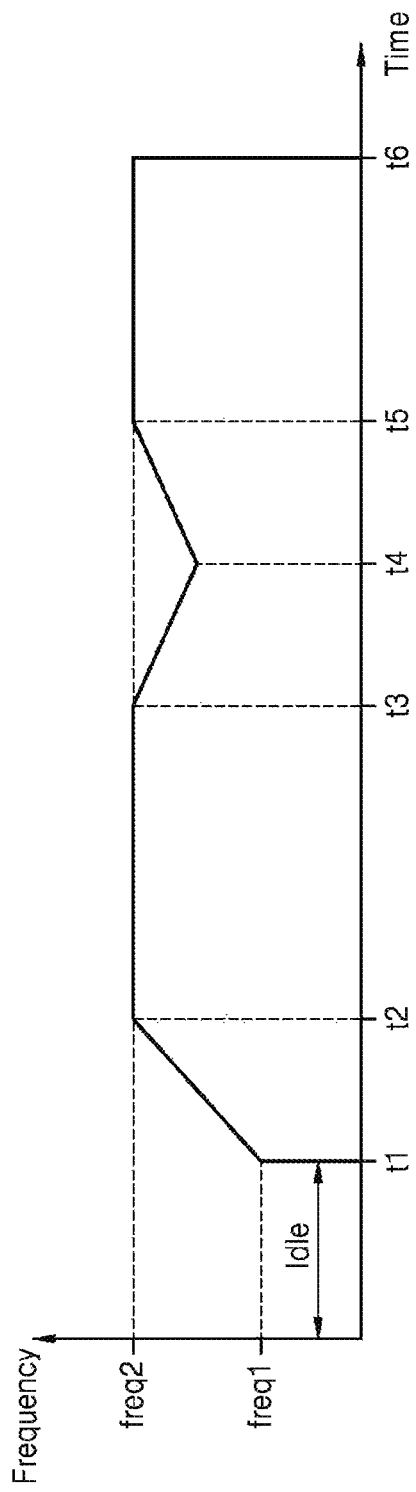
FIG. 19 is a signal timing diagram illustrating a slave clock according to an embodiment of the inventive concept.
Figure 20:
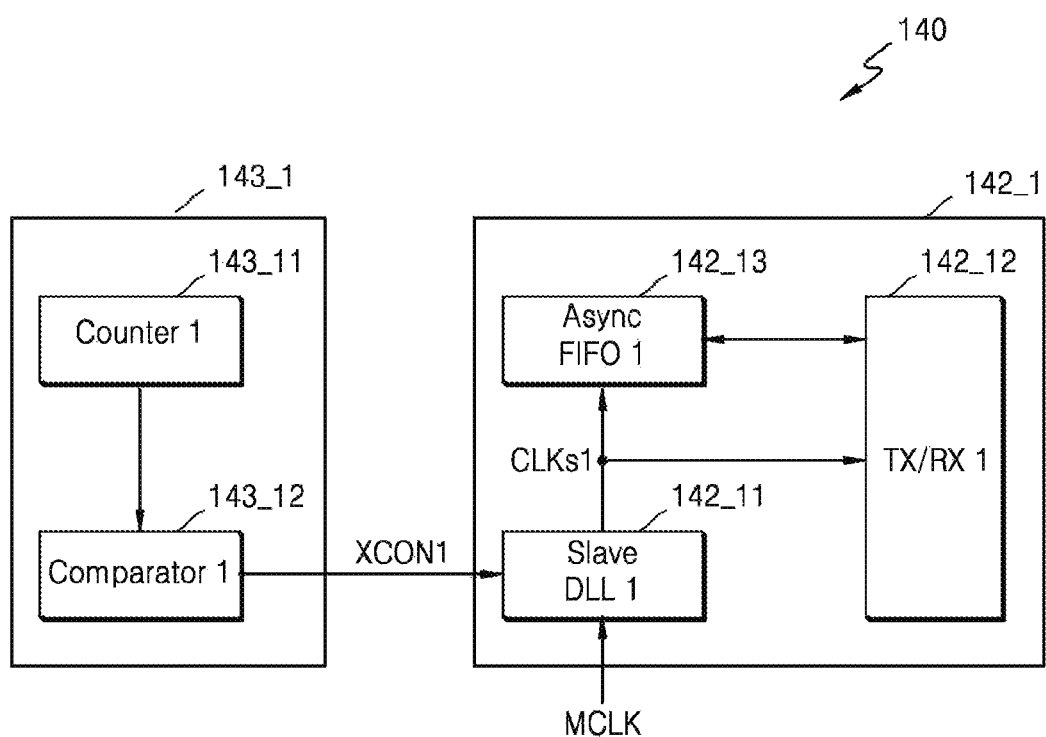
FIG. 20 is a block diagram illustrating the memory controller of FIG. 1 according to an embodiment of the inventive concept.

FIG. 19 is a signal timing diagram illustrating variation in the frequency of a slave clock according to another embodiment of the inventive concept. FIG. 20 is a block diagram illustrating the memory controller 140 of FIG. 1 according to another embodiment of the inventive concept. The slave clock according to the embodiment will be described with reference to FIGS. 19 and 20, and the first slave clock CLKs1 will be described as an example for convenience of description. However, the descriptions about the first slave clock CLKs1 may be applied to the other slave clocks CLKs2 to CLKsx. In addition, descriptions that will be provided below may be applied to a first channel interface having different structure from that of the first channel interface 142_1 of FIG. 20.

The frequency of the master clock MCLK may be modulated differently according to time. For example, the first clock modulator 142_11, that is, the first slave DLL, of the first channel interface 142_1 may modulate the master clock MCLK to a frequency between the first frequency freq1 and the second frequency freq2 during the period between time t1 and time t2. Here, time t1 may denote a time when the memory controller 140 wakes-up from the idle state, and time t2 may be set according to a degree of expected interference between symbols in the CAD signal information communicated via the first channel CH1. The first channel interface 142_1 may maintain the frequency of the first slave clock CLKs1 at the second frequency freq2 during the period between time t2 and time t3.

Here, time t3 may denote a time when the first asynchronous FIFO buffer 142_13 has a critical information data storage value. The critical value may be a value indicating that the first asynchronous FIFO buffer 142_13 is close to being full or empty. The first channel interface 142_1 may reduce the operating speed of a CAD signal communication via the first channel CH1 in order to prevent the first asynchronous FIFO buffer 142_13 from entering the full or empty state, thereby entering the wait state. This may be achieved by reducing the frequency of the first slave clock CLKs1.

Whether the first asynchronous FIFO buffer 142_13 has the critical value may be determined by the first interface controller 143_1. The first interface controller 143_1 may include a first counter 143_11 and a first comparator 143_12. The first counter 143_11 may count the number of empty entries of the first asynchronous FIFO 142_13. The first comparator 143_12 may receive a count value CNT from the first counter 143_11 and compare the count value CNT with the critical value of first asynchronous FIFO 142_13. As a result of this comparison, when the count value CNT is equal to the critical value, the first comparator 143_12 may transmit a first control signal XCON1 to the first channel interface 142_1. The count value CNT and the critical value may be about the number of entries of the asynchronous FIFO buffer.

The first clock modulator 142_11 formed as the first slave DLL may reduce the frequency of the first slave clock CLKs1 during the period between time t3 and time t4 in response to the first control signal XCON1 input at time t3. Here, time t4 may be set based on one or more environmental factors affecting the first channel interface 142_11 or the first channel CH1. Otherwise, time t4 may denote a time of applying an additional control signal by the first comparator 143_12 when the difference between the count value CNT and the critical value is equal to or greater than a certain value.

The frequency of the first slave clock CLKs1 may increase again during the period between time t4 and time t5. In addition, the frequency of the first slave clock CLKs1 may be maintained at the second frequency freq2 during the period between time t5 and time t6. The second to x-th channel interfaces 142_2 to 142_x may operate in the same manner as that of the first channel interface 142_1. The modulation of the input clocks CLKi to the slave clocks CLKs may be performed by the clock modulator 142_11 to 142_x1 in the channel interfaces 142.

As described above, according to memory systems and methods of operating memory systems according to embodiments of the inventive concept, initial pulses (e.g., pulse(s) generated during the period between time t1 and time t2) of a slave clock may be generated at a relatively low frequency, and thus, each of the plurality of memories may detect the initial pulse of the signal exactly, and thereby avoid erroneous operation of the memory system. Therefore, entering the wait state may be prevented, and thus, consumption of time and resourced used during an initial setting operations for the slave clock may be reduced.

In the above description, the example in which the delay and the modulation of the frequency are performed separately is described, but one or more embodiments are not limited thereto. According to the memory system and the method of operating the memory system according to another embodiment, the delay and the frequency modulation of the input clock may be performed simultaneously in each channel interface.

Figure 21:
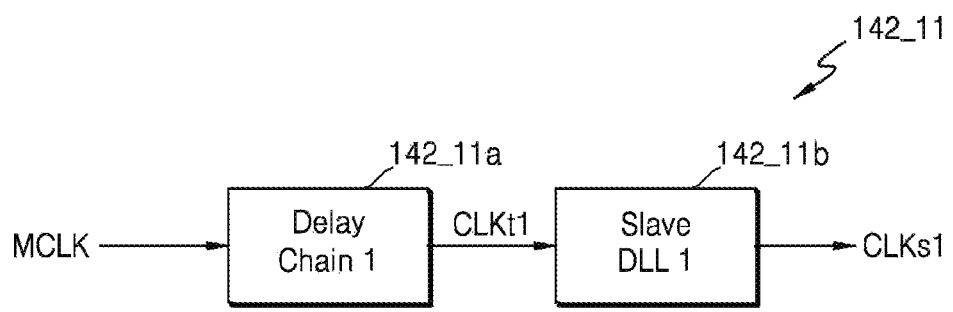
FIG. 21 is a block diagram further illustrating the first clock modulator of FIG. 20 according to an embodiment of the inventive concept.

FIG. 21 is a block diagram further illustrating the first clock modulator of FIG. 20 according to an embodiment of the inventive concept. Referring to FIG. 21, the first clock modulator 142_11 includes a first delay chain 142_11a and a first slave DLL 142_11b. The first delay chain 142_11a receives the master clock MCLK, and delays the master clock MCLK by a first value to generate a first temporary clock CLKt1. The first slave DLL 142_11b modulates a frequency of the first temporary clock CLKt1 to generate the first slave clock. The delay and the frequency modulation are described above, and thus, detailed descriptions thereof are omitted. FIG. 21 shows the first clock modulator 142_11 as an example, but the other clock modulators may perform similar functions to those of the first clock modulator 142_11 of FIG. 21.

Figure 22:
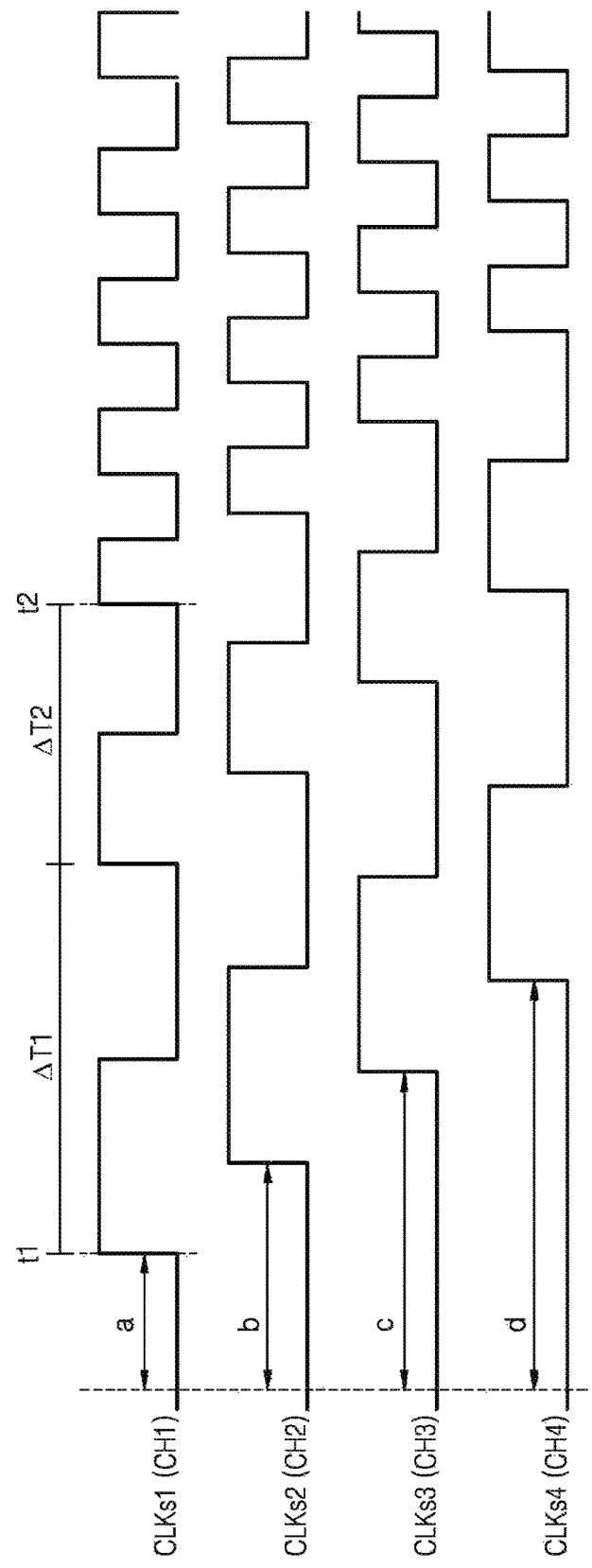
FIG. 22 is a signal timing diagram illustrating a slave clock according to an embodiment of the inventive concept.

FIG. 22 is a signal timing diagram illustrating slave clocks according to another embodiment of the inventive concept. The example shown in FIG. 22 assumes that the memory system 100 includes four (4) channels CH1 to CH4 and the memory controller 140 includes four channel interfaces 142. The first slave clock CLKs1 is generated earlier in the period after time t2 than during a period between time t1 and time t2, and the generation of the first slave clock CLKs1 becomes faster gradually in the period between time t1 and time t2 ($\Delta T1 > \Delta T2$). The periods between time t1 and time t2 with respect to the slave clocks CLKs1 to CLKsx corresponding to the other channels CH1 to CHx are the same as the first slave clock CLKs1. Also, the first through fourth slave clocks CLKs1 to CLKs4 are generated by delaying the phase of the master clock MCLK by as much as first through fourth phase shifts a, b, c, and d, respectively.

Therefore, according to memory systems and methods of operating memory systems according to embodiments of the inventive concept, the initial pulse of slave clock generation, wherein certain CAD signal(s) communicated via a channel are synchronized, is generated slowly, and thus, the memories may detect the CAD signal(s) even if initial pulse(s) of the CAD signal(s) are relatively small due to inter-symbol interference. Therefore, the inter-symbol interference may be substantially prevented. In addition, since the transition points of the CAD signal(s) are set differently in the channels, the power noise and/or EMI may be reduced.

Figure 23:
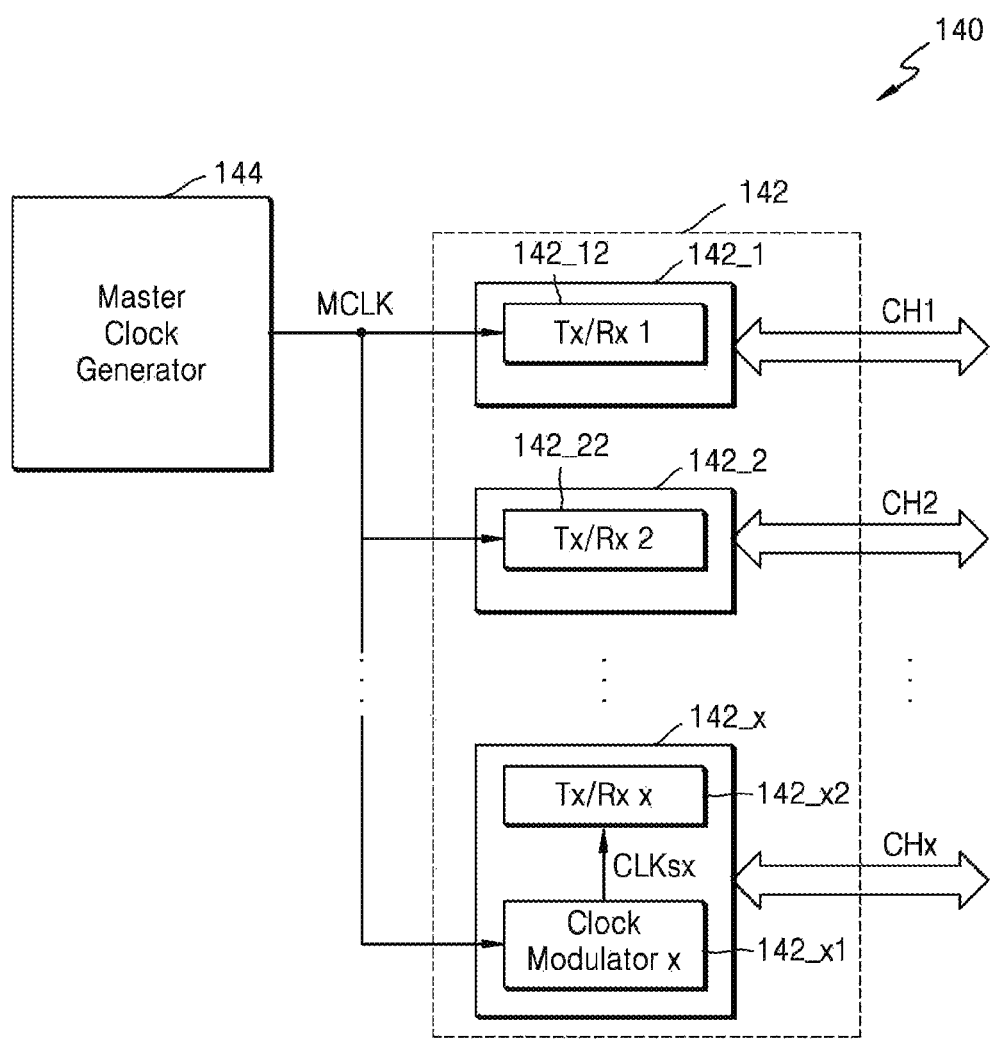
FIGS. 23, 24 and 25 are respective block diagrams variously illustrating the memory controller of FIG. 1 according to different embodiments of the inventive concept.
Figure 24:
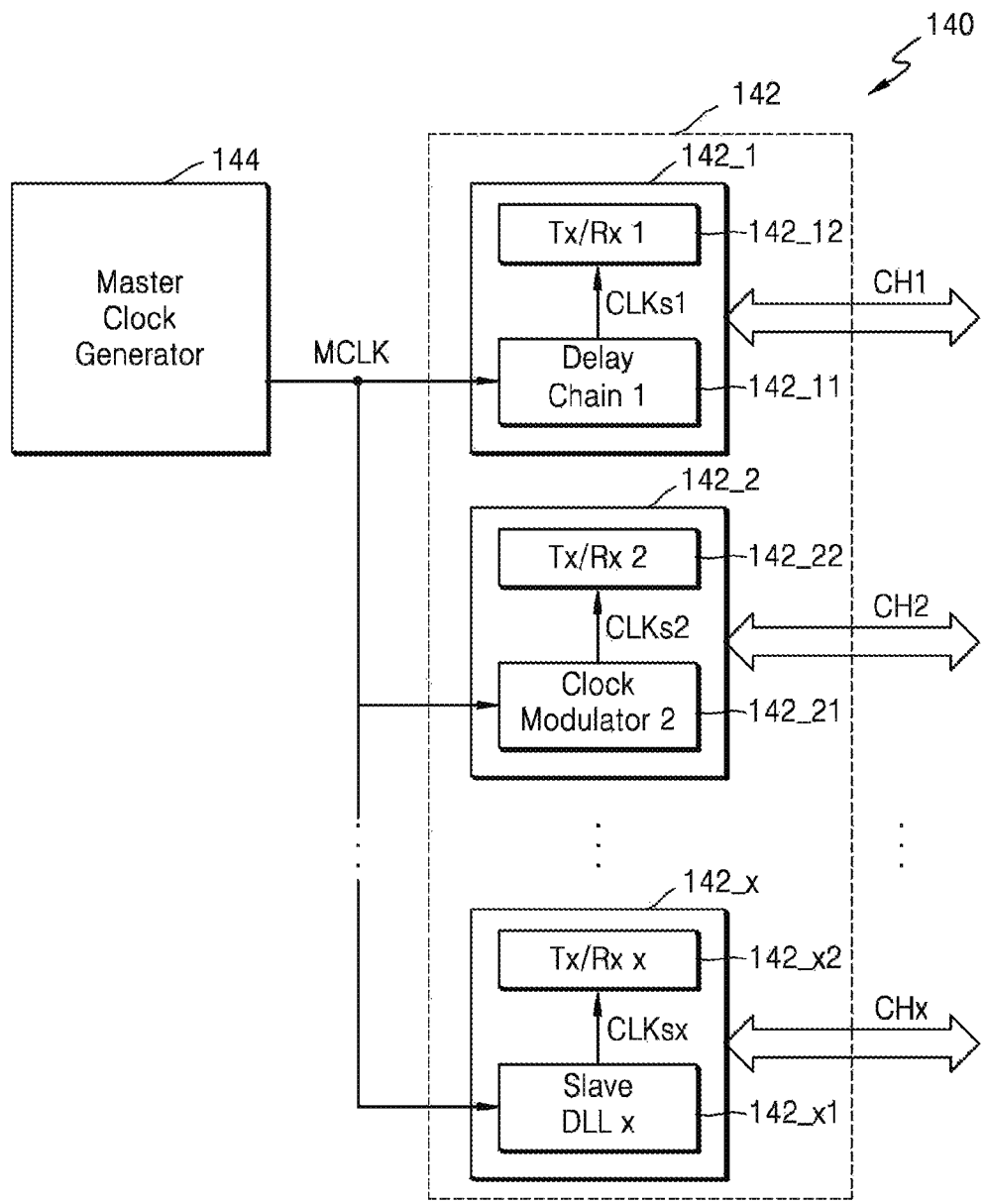
Figure 25:
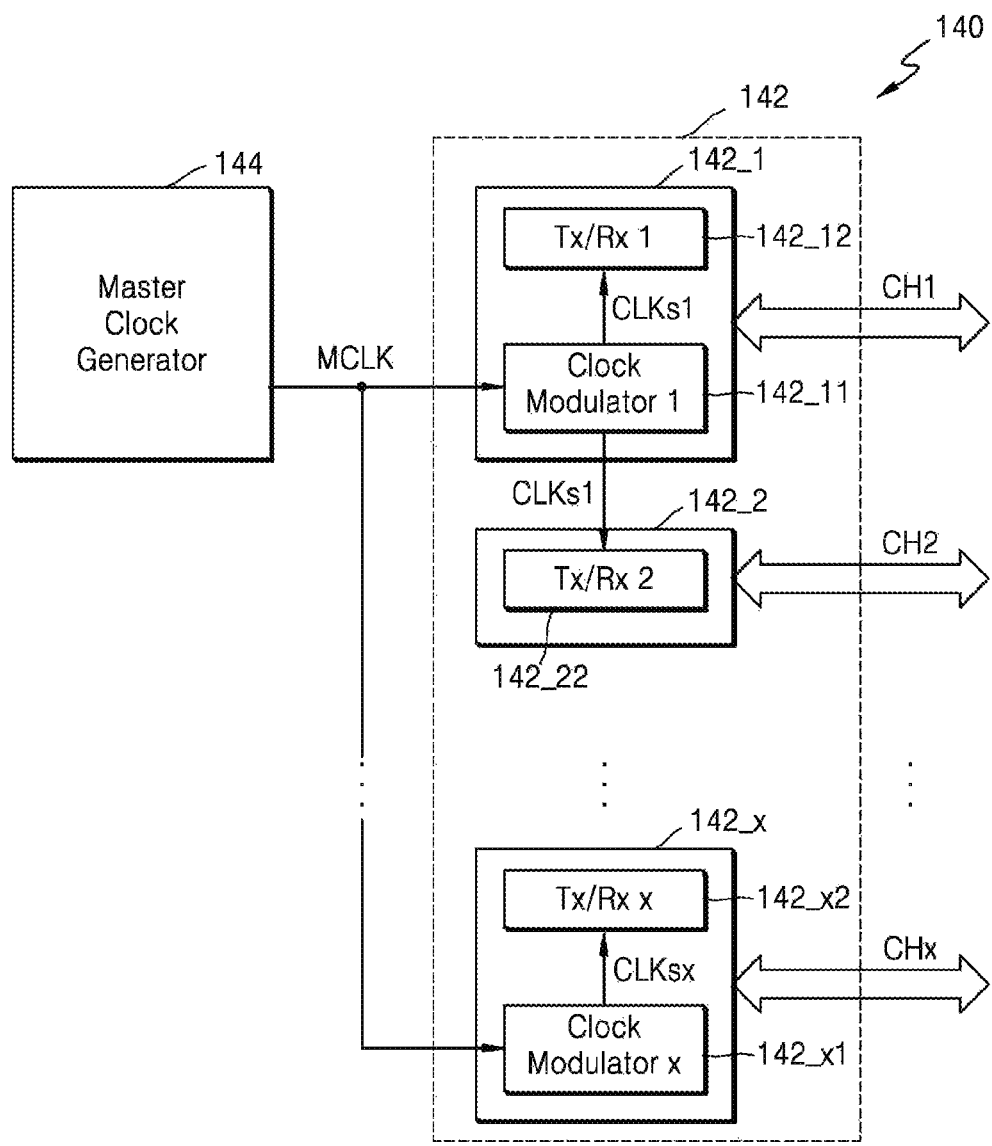

FIGS. 23, 24 and 25 are respective block diagrams further illustrating the memory controller 140 of FIG. 1 according to embodiments of the inventive concept. In the above described embodiments, the master clock MCLK or the input clock CLKi is mainly modulated in all of the channel interfaces 142, but one or more embodiments are not limited thereto. Referring to FIG. 23, the modulation operation may be performed only some of the channel interfaces 142. For example, the x-th channel interface 142_x from among the plurality of channel interfaces 142 may only modulate the master clock MCLK to generate the x-th slave clock CLKsx, and the other channel interfaces 142 may transmit/receive the signals by using the master clock MCLK that is not modulated.

In the above embodiments, all the channel interfaces 142 perform the same modulation operations, but are not limited thereto. Referring to FIG. 24, at least two channel interfaces from among the channel interfaces 142 may perform different modulation operations from each other. For example, the first channel interface 142_1 includes the first clock modulator 142_11 formed of the delay chain, whereas the x-th channel interface 142_x may include the x-th clock modulator 142_x1 formed of the slave DLL.

In the above described embodiments, each of the channel interfaces 142 separately performs the modulation operation, but is not limited thereto. Referring to FIG. 25, at least two channel interfaces from among the channel interfaces 142 may share one slave clock CLKs. For example, the second channel interface 142_2 may transmit and receive the signal via the second channel CH2 by using the first slave clock CLKs1 that is generated by the first channel interface 142_1.

Figure 26:
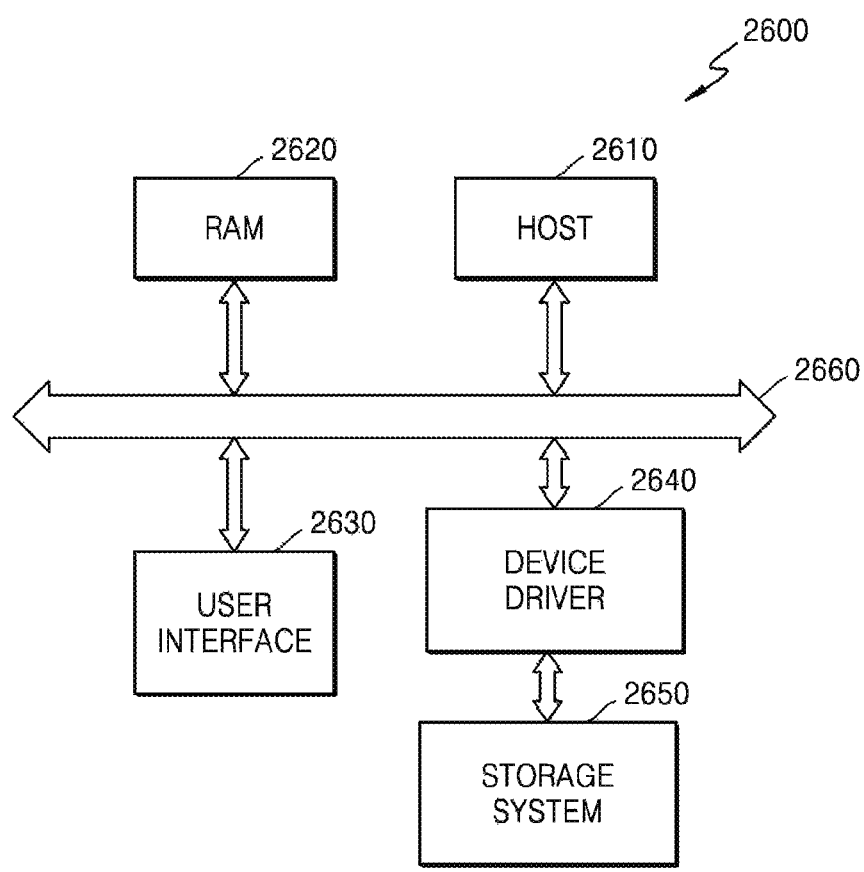
FIG. 26 is a block diagram illustrating a computing system including a non-volatile memory system according to an embodiment of the inventive concept.

FIG. 26 is a block diagram illustrating a computing system 2600 including a non-volatile memory system according to an embodiment of the inventive concept. The computing system 2600 according to the embodiment may be a mobile device or a desk top computer, and may include a host 2610 including a central processor unit (CPU), a random access memory (RAM) 2620, a user interface 2630, and a device driver 2640 that are electrically connected to a bus 2660. A non-volatile storage system 2650 may be connected to a device driver 2640. The host 2610 controls entire computing system 2600, and may perform a calculation corresponding to a user's command input through the user interface 2630. The RAM 2620 may function as a data memory of the host 2610, and the host 2610 may record or read the user data on/from the non-volatile storage system 2650 via the device driver 2640. Also, in FIG. 26, the device driver 2640 for controlling operations and management of the non-volatile storage system 2640 is disposed on an outer portion of the host 2610, but the device driver 2640 may be disposed in the host 2610. The non-volatile storage system 2650 may be the memory system 100 of FIG. 1. Therefore, the computing system 2600 may perform precise operations by minimizing influence of inter-symbol interference, power noise, and/or EMI.

While the inventive concept has been particularly shown and described with reference to embodiments thereof, it will be understood that various changes in form and details may be made therein without departing from the scope of the following claims.

What is claimed is:

1. A memory system, comprising:
a memory controller comprising a plurality of channel interfaces including a first channel interface and a second channel interface;
a plurality of memories including a first memory group and a second memory group; and
a plurality of channels including a first channel connected to the first memory group and a second channel connected to the second memory group,
wherein the first channel interface comprises:
a first clock modulator that receives a first input clock and applies a first modulation to the first input clock to generate a first slave clock;
a first first-in-first-out (FIFO) buffer that receives and stores a first control, address and/or data (CAD) signal; and
a first transmitter/receiver (Tx/Rx) that receives the first CAD signals from the FIFO buffer and synchronously controls communication of the first CAD signals to the first memory group via the first channel in response to the first slave clock, and
wherein the second channel interface comprises:
a second clock modulator that receives a second input clock and applies a second modulation, different than the first modulation, to the second input clock to generate a second slave clock, different from the first slave clock;
a second FIFO buffer that receives and stores at least one of second CAD signals; and
a second Tx/Rx that receives the second CAD signals from the second FIFO buffer and synchronously controls communication of the second CAD signals to the second memory group via the second channel in response to the second slave clock.

2. The memory system of claim 1, wherein the memory controller further comprises a master clock generator that generates a master clock, and
each one of the first input clock and second input clock is the master clock as commonly applied to the first channel interface and second channel interface.

3. The memory system of claim 1, wherein at least one memory in each of the first memory group and second memory group is a flash memory comprising a plurality of flash memory chips.

4. The memory system of claim 2, wherein transition points for the first CAD signals are skewed in time with respect to transition points for the second CAD signals.

5. The memory system of claim 2, wherein application of the first modulation to the first input clock includes applying up to a first phase shift to the first input clock, and application of the second modulation to the second input clock includes applying up to a second phase shift to the second input clock, wherein the first phase shift is different from the second phase shift.

6. The memory system of claim 1, wherein the memory controller further comprises:
a master clock generator that generates a master clock applied to the first channel interface as the first input clock, and
the first slave clock generated from the first input clock by the first clock modulator is provided to the second channel interface as the second input clock.

* * * * *